US007072296B2

(12) United States Patent
Turner et al.

(10) Patent No.: US 7,072,296 B2
(45) Date of Patent: Jul. 4, 2006

(54) METHODS AND APPARATUS FOR NETWORK SIGNAL AGGREGATION AND BANDWIDTH REDUCTION

(75) Inventors: R. Brough Turner, Newton Corner, MA (US); Kevin J. Bruemmer, Southington, CT (US); Michael R. Matatia, Stow, MA (US); Andrei E. Toma, Westboro, MA (US); Aram Falsafi, Watertown, MA (US); Svetlana O. Sokolova, Newton, MA (US); Murtaza Amiji, Natick, MA (US); Charles C. Linton, Southborough, MA (US); James M. Van Donsel, Waltham, MA (US); Benoit Delorme, Varennes (CA); Paul Trudel, St-Hubert (CA); David Ouellet, Brossard (CA); Jean-Hugues Deschenes, Anjou (CA); Daniel F. Daly, Bolton, MA (US)

(73) Assignee: NMS Communications Corporation, Framingham, MA (US)

( * ) Notice: Subject to any disclaimer, the term of this patent is extended or adjusted under 35 U.S.C. 154(b) by 475 days.

(21) Appl. No.: 10/633,260

(22) Filed: Aug. 1, 2003

(65) Prior Publication Data

US 2004/0077345 A1    Apr. 22, 2004

Related U.S. Application Data

(60) Provisional application No. 60/460,597, filed on Apr. 4, 2003, provisional application No. 60/401,503, filed on Aug. 6, 2002.

(51) Int. Cl.
*H04J 1/16*    (2006.01)
*H04J 3/14*    (2006.01)

(52) U.S. Cl. .................. 370/230.1; 370/231; 370/235; 370/413; 370/420

(58) Field of Classification Search ............. 370/230.1, 370/231, 235, 413, 420
See application file for complete search history.

(56) References Cited

U.S. PATENT DOCUMENTS 5,349,636 A    9/1994    Irribarren ................. 379/89

(Continued)

FOREIGN PATENT DOCUMENTS

WO    WO 98/21872    5/1998

OTHER PUBLICATIONS

E. Livinson / "Exchanging SGML documents using internet mail and MIME," Computer Standards & Interfaces 18 (1996) 93-102.

MailMan, Endymion Corporation, http://web.archive.org/web/1998 . . . endymino.com/products, XP-002247286, 1996, 2 pages.

(Continued)

*Primary Examiner*—Dang Ton
*Assistant Examiner*—Inder Pal Mehra
(74) *Attorney, Agent, or Firm*—Chapin IP Law, LLC; Barry W. Chapin, Esq.

(57) ABSTRACT

Wireless network demands continually increase as wireless service providers pursue additional service capabilities. In a cellular communication system, leased lines between remote cell sites and the corresponding Mobile Switching Offices (MSOs) remain a major operating cost. Bandwidth reduction by identification and elimination of payload data and control information which need not be fully replicated because it can be deduced from information accessible or previously transmitted allows fewer lines to support the same bandwidth. A wireless access gateway is operable to aggregate such redundant and regenerable data on a backhaul link between a wireless cell site and the corresponding mobile switching office (MSO) to provide low-latency, type specific lossless bandwidth reduction. The wireless access gateway identifies regenerable information and eliminates portions of the data which the device need not transmit because the data is redundant, or accessible or recreatable, at the receiving side. In this manner, the access device allows fewer lines to carry the reduced message traffic by transmitting only the non-recreatable data and eliminating message traffic for regenerable information.

90 Claims, 15 Drawing Sheets

U.S. PATENT DOCUMENTS

| | | | |
|---|---|---|---|
| 5,815,663 A | 9/1998 | Uomini | 395/200.49 |
| 6,459,687 B1 | 10/2002 | Bourlas | 370/328 |
| 6,577,595 B1 | 6/2003 | Counterman | 370/230 |
| 6,628,609 B1 | 9/2003 | Chapman | 370/229 |
| 6,643,260 B1 | 11/2003 | Kloth | 370/235 |
| 2004/0042510 A1* | 3/2004 | Bremer et al. | 370/539 |

OTHER PUBLICATIONS

XP 000659566, Integrated Web and Telephone Service Creation, David L. Atkins, et al., Bell Labs Technical Journal, Winter 1997.

* cited by examiner

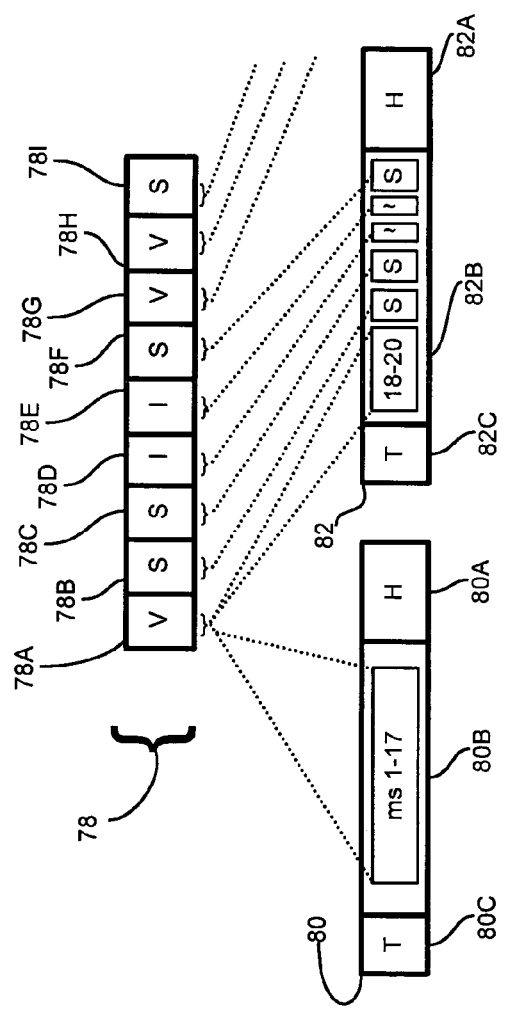

METHODS AND APPARATUS FOR NETWORK SIGNAL AGGREGATION AND BANDWIDTH REDUCTION

CLAIM TO BENEFIT OF EARLIER FILED PROVISIONAL PATENT APPLICATIONS

This invention claims the benefit of the filing dates and disclosure contained in the following earlier filed U.S. Provisional Patent Applications:

1: Provisional Patent Application having U.S. Ser. No. 60/401,503 filed Aug. 6, 2002, entitled "DIGITAL CIRCUIT MULTIPLICATION EQUIPMENT FOR A WIRELESS SERVICE PROVIDER'S RADIO ACCESS NETWORK"; and 2: Provisional Patent Application having U.S. Ser. No. 60/460,597 filed Apr. 4, 2003, entitled "METHODS AND APPARATUS FOR DIGITAL CIRCUIT MULTIPLICATION".

Each of the above referenced Provisional Patent Applications shares co-inventorship with, and is assigned to the same assignee as the present Patent Application. The entire teachings and disclosure of these two referenced provisional Patent Applications are hereby incorporated by reference herein in their entirety.

BACKGROUND OF THE INVENTION

Modern conventional computer networks transport an ever increasing volume of data between interconnected computers. Bandwidth-hungry user applications continually burden such computer networks, such as a collection of interconnections known as the Internet and many other subnetworks such as intranets, extranets, and LANs, with demands for additional throughput volume to allow the conventional networks to transport additional data.

The conventional interconnections in such networks include a variety of wired and wireless transport mechanisms such as cellular, Global System Mobile (GSM), satellite, optical fiber, coaxial cable, and twisted pair, to name several. The conventional transport mediums carry a broad diversity of traffic types, such as voice, data, streaming media, and signaling traffic according to many different protocols and switching mechanisms, such as TCP/IP, CDMA, TDMA, FDMA, ATM, and others as are known to those skilled in the art.

In a conventional wireless communications network, that originally evolved to support simple analog wireless voice communications, new increasing demands for services and applications such as digital voice, remote email, wireless Internet, and laptop computer support have imposed additional bandwidth demands and additional message traffic formats, or protocols, to support the user demand for these new features. The so-called first generation (1G) analog voice cellular network infrastructure has evolved to support second generation (2G) voice and data, and is rapidly moving in the direction of widespread third generation (3G) deployment, including support for digital voice, enhanced data services and signaling support.

The increasing wireless demand and corresponding deployment of additional conventional wireless transceivers drives a need to provide sufficient wired links to the transceivers. In a conventional wireless communications network, field deployment of base transceiver stations (BTSs) at a conventional "cell site" support wireless links to a plurality of wireless subscribers (end-users) that operate wireless phones and other mobile communications equipment. Dense deployment of conventional BTSs and other equipment operable to support end-user wireless connections strives to allow uninterrupted, high-bandwidth support to the wireless subscribers. Typically, however, multiple BTSs couple to a conventional mobile switching office (MSO) via a conventional wired or "land line" that in turn provide a data communications link for interconnection into a public access network such as a Public Switched Telephone Network (PSTN) or a computer network such as the Internet. Deployment of additional cell sites to support to increasing numbers of subscribers and additional BTSs requires sufficient high speed trunk lines between the cell sites and the MSO to support the increasing number of conventional end-user wireless connections.

SUMMARY

Conventional wireless network providers operating the MSO typically employ leased lines for the high speed communications trunks between the cell sites and the MSO in support of conventional wireless communications networks. Due to economic, regulatory, and other socio-economic factors, widespread deployment of new or additional physical data communications trunk lines between cell sites and an MSO may not be feasible. In addition, leased line costs for these trunk lines become significant operating expenses when bandwidth demand requires substantial wired link trunk capacity between the conventional cell sites and the conventional MSO. Accordingly, embodiments of the invention are based in part on an observation that minimizing the number of conventional leased lines required for adequately servicing the cell sites for communication with an MSO is a major consideration in providing wireless service to a large number of subscribers.

Conventional techniques for addressing increasing bandwidth demands include adding additional lines and purchasing additional, faster hardware to provide additional throughput on existing lines. Further, conventional data reduction techniques to reduce the message traffic volume include identification and repackaging of transmitted data to reduce message traffic size, including bit compression and other mathematical convolutions to reduce bandwidth requirements. Such conventional approaches suffer from several shortcomings. Latency time to perform the mathematical computations and convolutions for repackaging and unpackaging transmitted data is substantial. Accordingly, a voice user in conventional systems, for example, experiences a noticeable delay in transmission time. Further, conventional approaches do not classify traffic according to type in order to optimize the reduction technique applicable to each type of data. Also, such repackaging may lose certain bits of information which the receiver cannot replicate.

Wireless network demands for both voice and data are consistently increasing as conventional wireless service providers and hardware (wireless phone) manufacturers continually pursue additional applications, services, capabilities and features in user offerings. To support these additional services, a conventional cellular service operator must maintain or often add multiple additional leased lines, typically in the form of terrestrial, microwave, HDSL, or other multiples of T1/E1 channelized aggregates (i.e. n*2.048 Mbps) to each cell site from an MSO in order to maintain sufficient bandwidth for the increased data communications requirements. Further, such conventional cell sites often have a requirement to support many different types of message traffic, including so called 1G, 2G, 2.5G, and 3G traffic, each of which may require a conventional dedicated land-line trunk link from the BTS/BSC to the switching office.

Typically, therefore, a conventional wireless operator maintains such a dedicated link for each type of supported message traffic between each cell site supported by a MSO. As an example, if an operator configures a conventional cell site to support both 2G and 3G wireless communications protocols, that operate must provide dedicated high speed trunk communications links for each type of traffic to the MSO from each cell site in that operators network. Further, multiple redundant links for each traffic type (e.g., multiple 2G and 3G links) may be required between conventional cells sites and conventionally equipped MSOs to support peak demand with acceptable user response. With the modern trend of bandwidth-hungry wireless applications, such as digital voice, video phones, wireless Internet, and other high-bandwidth and real-time applications, the demand for low latency, low error rate wireless links increases. Accordingly, embodiments of the invention provide wireless operators with bandwidth reduction techniques including low-latency lossless compression to mitigate the expense of leasing or adding additional lines between cell sites and an MSO to keep up with subscriber demand.

Embodiments of the invention, therefore, provide an apparatus, systems, and methods for efficient optimization of the use of conventional leased lines between cell sites and an MSO, particularly during periods of peak usage, without compromising the service level to subscribers. Various configuration of the invention, as disclosed herein, provide bandwidth reduction techniques applicable to a plurality of leased lines (links or trunks) between an MSO and corresponding cell sites to allow acceptable similar performance as compared to conventional cell site-MSO system configurations, but using fewer leased lines than such conventional systems, thereby mitigating operating expenses to wireless operators by permitting the wireless operators to provide the same bandwidth (throughput) between the cell site and the MSO on fewer leased lines. Such techniques, such as low-latency lossless compression, provide flexibility for trade-offs between the degree of reduction, or compression efficiency, against latency.

Cell sites typically support a plurality of protocols (e.g., data, voice, signaling) over various data communications mediums (e.g., ATM, IP or TDM links). Often, such protocols employ data items (e.g., periods of silence or idle portions of communication) and control information (e.g., redundant signaling information) that is duplicative, redundant, and/or sparse. Accordingly, embodiments of the invention provide the ability to identify and eliminate transmission of unneeded, redundant or duplicative payload data (e.g., silence or idle frame data) and control information (e.g., redundant signaling information) over the data communications link(s) that exist between a cell site and an MSO. The data representing such duplicative, redundant, and/or sparse transmissions is replaceable with placeholders and tag fields which, according to a predetermined protocol providing a common data or packet format, allows the placeholders to convey regenerable information which is deduceable at a receiving side without actually having to transmit such data.

Generally, embodiments of the invention provide an access gateway data communications device that operates in both a cell site and an MSO. The access gateway device of this invention is a computerized device that optimizes the bandwidth utilization of 2G and 3G mobile data communications traffic sent on the data communications trunk lines of links between a cell site and MSO equipped with the access gateway. As an example, an access gateway device of this invention operates to aggregate or multiplex, via bandwidth reduction (i.e. lossless compression) mobile traffic from multiple cell site services into a common packet format and can transmit this common packet format onto a trunk line using, for example, time division multiplexing (TDM) for receipt by another access gateway configured according to embodiments of the invention that operates in the receiving MSO.

The receiving access gateway performs a reverse operation in order to receive the common packet format traffic and uncompress, un-aggregate and un-multiplex the common packet format into the data streams as originally received by the access gateway prior to processing in the cell site. Within an MSO, the access gateway of this invention operates to terminate the common packet format streams from multiple cell sites that each operate an access gateway of this invention. In other words, the MSO gateway of this invention process the traffic from each cell cite (i.e., the traffic formatted according to this invention) and reconstructs the original frames and channels which the MSO then delivers to conventional base station controllers or, when applicable, to 3G radio network controllers.

Accordingly, embodiments of the invention can operate to identify regenerable information in message traffic between a cell site and an MSO. Once identified, embodiments of the invention can represent such regenerable information in a format that allows a recipient device (e.g., the MSO if sent from the cell site, or the cell site if sent from the MSO) to reproduce such information in order to recreate the original stream of message traffic in a lossless manner. Such regenerable information corresponds, for example, to control information and data which is representable in alternate forms such that it need not be transmitted in its entirety in order to be replicated at the receiving side.

Further, configurations of the invention perform the lossless bandwidth reduction coupled with low latency, in a manner specific to the type of data. Conventional approaches receive an entire unit, such as a packet, of data prior to commencing analysis for bit compression, and then receive the entire packet at the receiving side prior to reversing the bit compression. Accordingly, such conventional approaches suffer from a delay (latency) of at least two times the time required to receive a unit (packet) of data. In the present invention, the low-latency bandwidth reduction classifies incoming data before receiving an entire frame, operating on data sufficient to classify and determine applicable bandwidth reduction techniques. Further, the receiving backhaul gateway begins reproducing the original data without waiting for an entire frame, but rather, when sufficient data (bits) are received. Accordingly, perceptible latency by a user is minimized.

As a specific example of operation of embodiments of the invention, audible speech transmissions represented by a wireless data communications protocol typically include many portions (e.g., frames) of silence (subtle background sounds represented as silence frames) and idle time (e.g., null frames) within which meaningful voice signals are not present as data. Embodiments of the invention can operation to reduce or eliminate the full representation such silence portions or idle signals from transmission in data between the cell site and the MSO. Within the receiving MSO, embodiments of the invention can then operate to receive and reproduce the silence or idle (null) signals or frames in order to re-create the original data communications signal. As another example, conventional cell sites may transmit a signal to an MSO containing certain types of redundant signaling information, such as data flags and toggles or bit stuffing that may be repeated in message packets. In some cases, once such flags or toggles are set, they are only significant when they change in value. Between such state changes, conventional cell site and MSO communications represent such signaling information as frames, even though those frames do not contain meaningful information (since no change occurs to the toggles or data flags). Embodiments of the invention can strip out or remove this type of redundant signaling information on the sending end (e.g., within a cell site) and can include this redundant information when it does indicate a change.

More specifically, particular configurations of the invention provide a wireless access gateway operable to aggregate redundant and regenerable data in the backhaul link between a wireless cell site and the corresponding mobile switching office (MSO). A pair of wireless gateway access devices of this invention operates in each side between high speed trunk lines, such as E1 and T1 links, connecting the cell site and the MSO. The wireless gateway device receives the wireless data and classifies the data according to traffic type. Examples of different traffic types can be 3G, 2G or other types of traffic. Based on the traffic type, the access device identifies regenerable information and eliminates portions of the data which the device need not transmit because the data is redundant, or accessible or recreatable, at the complementary wireless gateway device at the receiving side. The access device formats the reduced message traffic data without the regenerable portions, and transmits the message traffic over the high speed trunk. The receiving gateway device also operating according to embodiments of the invention identifies the message traffic type and the regenerable information to recreate the original wireless data from the regenerable information received in the reduced data format. In this manner, the access device of this invention reduces bandwidth over the high speed trunk lines, allowing fewer lines to carry the reduced message traffic by transmitting only the non-recreatable data and eliminating message traffic for regenerable information.

The gateway access device, by reducing the amount of data to transmit over the high speed trunk(s) between the cell site(s) and the mobile switching office, can delay or eliminate the expense of adding additional high speed trunk lines between the cell site and the MSO. For example, if a particular installation employs three T1 lines between a cell site and an MSO, a pair of access devices configured according to this invention, that are disposed between the cell site and the MSO, can achieve a 35% reduction in message traffic volume through reduction and elimination as explained herein. As a result, embodiments of this invention can alleviate the need for one of the T1 lines and thus save a network operator significant investment in capital resources. Therefore, two T1 lines between the access devices are operable according to the invention to carry the reduced, aggregated message load without the regenerable information which formerly required (using conventional configurations that do not include embodiments of the invention) three T1 trunk lines.

In further detail, the wireless gateway access device (e.g., a backhaul gateway in a particular cell site) of this invention is operable for aggregating and reducing network message traffic by identifying regenerable information in the message traffic at a sending side. The regenerable information includes data content in the message traffic reproducible at a receiving side from information accessible at the receiving side. The sending access gateway eliminates the identified regenerable information to reduce the volume and associated bandwidth requirements of the remaining message traffic to provide overall reduced message traffic (i.e., lower bandwidth). The access gateway of this invention then employs a backhaul protocol to frame the remaining message traffic according to predetermined formatting logic (e.g., a common packet format). The formatting logic provides transmission of the remaining reduced message traffic and supports regeneration of the reproducible data content from the identified regenerable information at the receiving side (e.g., within an access gateway in the MSO).

The message traffic includes message traffic packets. The operation of identifying the message packets further includes examining, in a classifier (provided in embodiments of this invention), portions of the message traffic packet indicative of a message payload carried in the message traffic packet, and further includes comparing, in the classifier, the portions of the message traffic packet to a predetermined set of expected message traffic types. Message traffic types can include, for example, 2G or 3G traffic. Classification logic in the classifier, then classifies, or selects, the message traffic type. The message traffic type is indicative of the regenerable information in the message traffic packet since each traffic type is formatted according to a predefined standard associated with that message traffic type.

Eliminating the identified regenerable information to reduce transmission bandwidth (volume) further includes mapping the message traffic to reducing logic. The reducing logic has reducing rules based on a message traffic type. This embodiment identifies, based on a match between the message traffic type and the reducing rules, the regenerable information, in which the reducing rules correspond to the message traffic type. The backhaul gateway of this invention then applies the selected reducing rules to the message traffic to generate a reduced message. The reduced message includes the remaining information in the message traffic without the regenerable information (i.e., the regenerable information is either absent from the reduced message completely, or is represented in a compressed or reduced form that a recipient access gateway can utilize to regenerate or reproduce the regenerable information in its unreduced, uncompressed form).

In addition to the aggregation and reduction performed by the bandwidth reduction engines, various error correction and/or authentication operations may be applied to the aggregated, reduced date. For example, Forward Error Correction (FEC) encoding may be applied to the header portion, data payload portion, or a subset or combination thereof.

Framing the reduced, aggregated message traffic for transmission according to the formatting logic of the backhaul protocol of this invention further includes identifying, according to the formatting logic, the non-recreatable portions of the message traffic, and storing, in a message traffic packet, the remaining message traffic. The remaining message traffic includes non-recreatable portions of the message traffic. The backhaul gateway then stores, in the message traffic packet, an indicator corresponding to the regenerable portion of the message traffic packet. The reducing logic at the receiving end is responsive to the indicator to reproduce the regenerable portions of the message traffic. In this manner, redundant original traffic can be represented in a compressed format by an indicator that the recipient access gateway can use to recreate the original traffic.

The framing in the backhaul protocol, in a particular configuration, further includes formatting, according to the formatting logic, the remaining message traffic into a message packet format. The message packet format has a common protocol format (backhaul protocol or common packet format) provided according to the formatting logic and is applicable to a plurality of message traffic types. The common protocol format is operable to be transmitted to the receiving side for recovering or recreating the original message traffic.

Receiving the backhaul protocol traffic at an opposed (receiving) side of the backhaul link further includes, in a particular configuration, receiving a plurality of reduced data streams according to (i.e., formatted in) the common protocol format. The common protocol format is encoded as formatting logic at the receiving side that receives the reduced data streams. The receiving backhaul gateway unframes, according to the formatting logic, the reduced data streams according to the backhaul protocol format, and identifies, from the aggregation rules in the reducer, regenerable information corresponding to the received reduced data. The backhaul gateway reproduces, based on the identified regenerable information, the reproducible data content eliminated at the sending side, and regenerates, by integrating the reproduced data content with the remaining message traffic, the original message traffic including the reproducible data content. The backhaul gateway then forwards the original message traffic to an intended remote receiver by classifying, in the classifier, the type of message traffic of the original message traffic integrated with the reproducible data content. This operation typically occurs in the MSO, though it is to be understood that the operations of the invention can occur in all traffic from cell site to the MSO, as well as in traffic from the MSO to a particular cell site.

In a particular configuration such as used in a cell site, the backhaul gateway transmits speech data from wireless phones. The transmission of speech data further includes identifying segments of speech data in the message traffic. The speech segments have a header including a vocoder field indicative of a vocoder, and a content portion corresponding to speech data. The transmission includes demarcating segments of the speech data corresponding to voice, silence, and idle content portions.

The speech data processing further eliminates reproducible speech data by reducing, if the speech data segment corresponds to silence, the duration of the silence content portion. This is done in one embodiment by including only a portion of the speech data segment, and eliminating, if the speech data segment has an idle content portion, the idle speech data segment from the non-recreatable data content item. In addition, if the speech data segment has a voice content portion (i.e., that must be included as it cannot be reproduced from a compressed format on the receiving side), the voice speech data segment is processed as a non-recreatable data content item.

In another particular configuration, the backhaul gateway is operable to reduce and aggregate signaling data by analyzing the data content for data content segments including signaling data by eliminating control fields corresponding to control information specified in previous signaling data content segments. Such signaling data may further include, by way of example only, high-level data link control (HDLC) information operable to provide wireless signal control for at least one of signaling channel selection, power control, reception levels, number dialed, bit padding, keep alive indicators, and control flags.

Such signaling data, in a particular configuration, arranges control according to a layered stack, in which the layers correspond to mapping and partitioning control, and to data content fields. The layers further include: a receiving layer operable to receive data from a user application; a selection layer operable to analyze the data in the receiving layer and to select data adapted to be transmitted; an efficient optimization layer operable to aggregate and reduce the data adapted to be transmitted (i.e., the aggregating and reducing resulting in a lower volume of data for transmission); and a transport layer operable to transmit a bit-exact payload corresponding to the aggregated and reduced data from the efficient optimization layer.

In another particular arrangement, the backhaul gateway performs traffic shaping, or prioritization and overload management to accommodate priority based on loss tolerance of the reduced and aggregated transmissions. The gateway of this invention provides such traffic shaping by computing an urgency factor corresponding to the reduced message traffic. A framer, responsive to the urgency factor, determines the transmission order for formatted message traffic. The system operates to prioritize outgoing message traffic from the framer according to the priority. The priority is based on a predetermined delay tolerance of the data content type. The reducer, using reducing logic, modifies the outgoing traffic, for example, by adjusting compression parameters corresponding to a degree of reduction. In traffic shaping, if the access gateway of this invention senses that maximum bandwidth use is approaching, the access gateway is able to inform upper layer protocols that the link between the cell site and MSO is being highly utilized and that these upper layer protocols are to take steps to mitigate the amount of traffic being sent to the access gateway.

In another arrangement, the backhaul gateway is operable to reduce and aggregate ATM (Asynchronous Transfer Mode) transmissions by identifying message traffic having a fixed packet size and having a header corresponding to a particular circuit and replacing the header with an efficient header having a shorter length and corresponding to an alternate replacement circuit from a smaller set of available circuits. Further, the gateway detects ATM padding and idle cells for maintaining cell alignment in the absence of payload data, since such padding and idle cells are recreatable at the receiving gateway. In this manner, if the access gateway in a cell site receives ATM cell streams, such streams can be aggregated and redundant or reproducible portions can be eliminated and represented by smaller portions of data in the common protocol format provided by embodiments of this invention.

In another configuration, the backhaul gateway provides fault-tolerant operation via an automatic failover operation. The failover operation involves detecting an operability condition of the backhaul gateway serving one of the sending and receiving sides. The backhaul gateway identifies a number of operational lines between the sending and receiving sides (e.g., multiple lines between the access gateways in a cell site and an MSO), and selects a number of available incoming lines to the sending side of the backhaul gateway to remain in service as failover lines (i.e., in the event of a failure of the access gateway). In the event of a failure of the access gateway, for each available line remaining operational, the backhaul gateway automatically maps the failover lines to a particular operational line between the sending and receiving sides, either through a configuration specified selection or automatic selection from available operational lines. Synchronization with the complementary backhaul gateway occurs by informing the complementary sending or receiving side (i.e., the access gateway that was in communication with the now failing or failed access gateway) of the operability condition (i.e., of the failure), and subsequently routes traffic received on each of the failover lines to the corresponding operational line. In this manner, if an access gateway for example in a cell site fails for some reason, one or more of the cell tower links (e.g., providing 2G, 3G, etc. traffic into the access gateway for aggregation) can be selected to be bypassed around the access gateway in the event of the failure. Such traffic would no longer be processed into the compressed format, but communications could continue for those lines selected for failover protection. The receiving access gateway in the MSO (i.e., that did not experience the failure) can sense the failed access gateway (e.g., via loss of a heartbeat or other periodic signal) and can likewise discontinue processing of aggregated common protocol format packets and can begin to channel the uncompressed "conventional" traffic through the access gateway without the de-multiplexing operations explained herein. In this manner, even though a failure occurs, the failed access gateway does not completely compromise all communications.

The features of the invention, as described above, may be employed in systems, data communications devices and methods, as well as other computer-related components such as those of NMS Communications, Inc., of Framingham, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 9 shows the aggregation rules in the backhaul gateway device of FIG. 4 in greater detail.

FIG. 10 shows reduction of speech message packets in the backhaul gateway device of FIG. 4.

DETAILED DESCRIPTION

Figure 1:
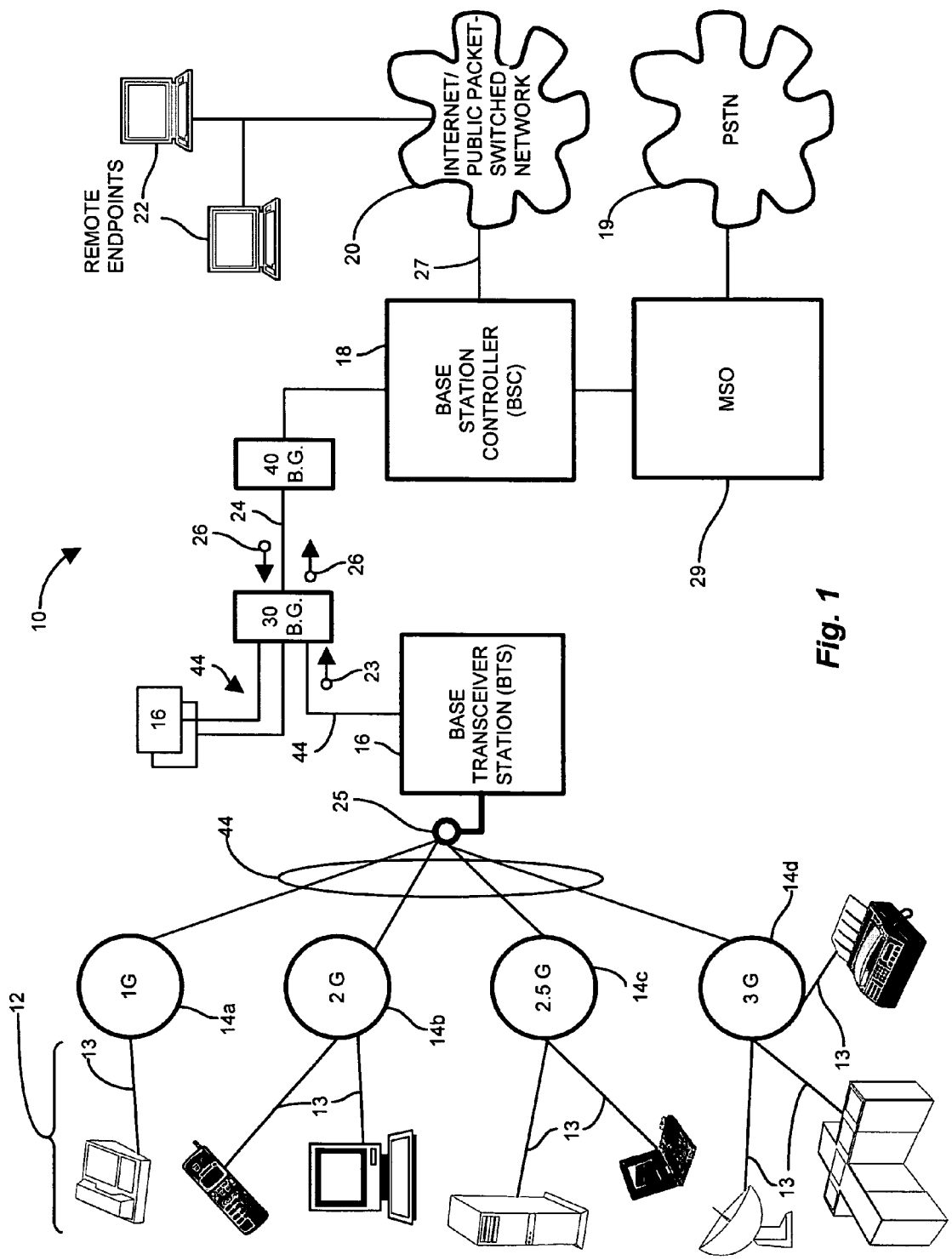
FIG. 1 is a context diagram of a communications network which is suitable for use with the present invention employing a backhaul link supporting wireless communications as defined herein.

Embodiments of the invention provide a wireless access gateway operable to aggregate redundant and regenerable data in the backhaul link between a wireless cell site and the corresponding mobile switching office (MSO) and provide low-latency type-specific lossless bandwidth reduction. In one configuration, a pair of wireless access gateway devices of this invention operates on each side of the backhaul link between (i.e., coupled by) one or more high speed trunk lines, such as E1 and T1 links, connecting the access gateway in the cell site and the access gateway in the MSO. The wireless access gateway (also referred to herein as a "backhaul gateway") device of this invention receives one or more streams of wireless data (e.g., 2G or 3G data) and classifies the data according to traffic type. Based on the traffic type, the backhaul gateway device identifies regenerable information in the data stream(s) and eliminates portions of the data that the device need not transmit because the data is redundant, or accessible or is recreatable, at the complementary access device on the receiving side. The backhaul gateway device of this invention formats the reduced message traffic data without the regenerable portions, and transmits the reduced message traffic over the high speed trunk (i.e., to the receiving access gateway). The receiving backhaul gateway device receives this compressed or reduced traffic and identifies the message traffic type, and then identifies the regenerable information to recreate the original wireless data from the regenerable information in the reduced data format. In this manner, the backhaul gateway device of this invention reduces bandwidth required over the high speed trunk lines linking cell sites to MSOs, thus allowing fewer lines to carry the reduced message traffic by transmitting only the non-recreatable data and eliminating message traffic for regenerable information.

The backhaul gateway device, by reducing the amount of data to transmit over the high speed trunk between the cell site and the mobile switching office, can, in some cases, eliminate or postpone the need for some of the physical lines between the cell site and the MSO. For example, if a particular installation employs three T1 lines between a cell site and an MSO, a pair of backhaul gateway devices of this invention disposed between the cell site and the MSO can achieve a 35% reduction in message traffic volume through reduction and elimination. This alleviates the need for one of the T1 lines and saves to network operator considerable capital resources. Therefore, two T1 lines between the backhaul gateway devices are operable to carry the reduced, aggregated message load without the regenerable information which formerly required three T1 trunk lines (i.e., in a system not equipped with embodiments of the invention).

The backhaul gateway device of embodiments of this invention repackages, according to formatting logic, the original message traffic received from a wireless subscriber by the cell site or received at the MSO and addressed to such a wireless subscriber. The backhaul gateway at the sending side identifies regenerable information, eliminates the recreatable data that this information corresponds to, and repackages (frames) the message traffic according to the common protocol format (or common packet format). The backhaul gateway on the receiving side of such common protocol format traffic operates in a complementary manner to unframe the message traffic in the common protocol format and recreates the data eliminated on the sending side, using the common protocol format and the identifiable regenerable information. The receiving side thus reproduces the message traffic as a packet similar to the form in which the sending backhaul gateway device received the original message traffic packet. Accordingly, the backhaul gateway device of embodiments of this invention is a bi-directional communications device operable to convert conventional 2G and 3G wireless traffic into the common protocol format as described herein for transmission between cell sites and an MSO (in both directions). The examples and description herein refer to a sending side and a receiving side, and should be taken to mean message traffic in either the uplink (from the wireless subscriber to the wired network) direction or the downlink (to the wireless subscriber) direction.

In further detail, in a general operational manner, the backhaul gateway provides data type specific, lossless bandwidth reduction in the manner outlined below. The specific bandwidth reduction technique depends on the type of the data traffic (i.e. frame, packet or cell, as the case may be). Such specific techniques for exemplary instantiations of the more common data types are discussed in the figures and accompanying discussion that follow. Other and analogous type specific bandwidth reduction techniques will be apparent to those skilled in the art.

In a general manner, the backhaul gateway has the ability to perform lossless compression with low latency and further, the ability to trade-off compression efficiency against latency for optimal performance. The backhaul gateway, in operation, instantiates flow-specific state machines on each distinct traffic flow (e.g. traffic type). For example, there are instantiations of different state machines for GSM voice channels, GSM signaling channels, 1G traffic, and either ATM cells in general or specific ATM flows (i.e. ATM virtual circuits tracked by the kinds of information being sent over them).

Each kind of state machine is optimized to identify where redundant information exists in its corresponding flow, with the state machine entering a separate state when a redundant frame or block of information is identified. Note there may be several different forms of redundant information in a specific flow. If so, these are represented by several different states. The classifier, described below, determines the traffic type and hence, the state machine to which a particular data item (frame, packet, cell) corresponds.

Each state machine processes the corresponding traffic type (flow) as directed by the aggregation processor via the classifier. At either fixed time intervals, or on a data-driven basis (i.e. driven by changes in one or more state machines), the aggregation processor combines:

a) the exact bits from each flow that is not in a redundant state b) a state change indication for each of those flows (channels) that have changed state since the last interval c) zero bits for those channels that are currently in a redundant state (and haven't changed state since the last interval).

The rate of such combination by the aggregation processor provides the granularity in the efficiency to latency balancing for optimal performance.

FIG. 1 is a context diagram of a communications network that is suitable for use with the present invention employing a backhaul link supporting wireless communications as defined herein. Referring to FIG. 1, the exemplary communications network 10 includes a plurality of subscriber 12 devices, or customer premises equipment corresponding to a plurality of subscribers 14a–14d (14n generally). Each of the subscribers 14n employs a particular type of connection class (1G, 2G, 2.5G and 3G) via wireless links 13, as shown by the subscribers 14a–14d respectively. The system 10 further includes at least one base station transceiver (BTS) 16 (several shown in this example), each having a wireless antenna 25 and a data communications link 44 (e.g., a T1, E1, A.bis or other high speed data communications link) to a backhaul gateway 30 configured in accordance with embodiments of the invention. Message traffic 23 from each BTS is sent over the data communications link 44 to the backhaul gateway 30 for transmission over a backhaul link 24 to a corresponding backhaul gateway 40 that operates in conjunction with a base station controller 18 (BSC)., Each backhaul gateway 30, 40 communicates using message traffic 26 in a common protocol format as will be explained. Remote endpoints 22, accessible via a network 20 such as the Internet (or other communications network, such as a Public Switched Telephone Network 19), provide a connection to the BSC 18.

In the exemplary network 10 shown in FIG. 1, each of the subscriber devices 12 operates using wireless communication with the BTS 16 via the antenna 25 using one of the connection classes 14n discussed further below. The BTS sends and receives wireless signals to and from the subscriber devices 14n, and transmits communications 23 to and from the backhaul gateway 30 over links 21. The backhaul gateway 30 typically connects to a plurality of BTSs 16, each located as a cell site in the field. The BSC 18 connects to the Internet 20 or a PSTN 19 via an Internet backbone or other data communications trunk 27 for communication with remote endpoints 22 (e.g., other computers or phones). The backhaul link 24 typically carries message traffic packets 26 corresponding to many different types of message traffic, depending on the messages and protocols of the different subscriber devices 12.

In operation, the connection classes of the subscribers 14n (e.g. subscriber, or user, operated devices, also known as terminal equipment or customer premises equipment) refer generally to the types of data communications technology which the BTSs 16 transmit as message traffic 23 to and from the backhaul gateway 30 over high speed links 44, and may include any type of wireless communications known in the industry to those of skill in the art. Generally, in this example these classes of message traffic 23 are as follows: 1G includes analog voice signals in digitized G.711 form; 2G refers to digital voice and circuit-switched data; 2.5 corresponds to digital voice and packet-switched data; and 3G refers to advanced and/or high bandwidth multimedia communications, such as color screen phones that can communicate digital data including voice, video, pictures, and other types of messages.

Generally, embodiments of the invention operate, in this example, as the corresponding pair of access gateway devices (i.e., backhaul gateways) 30 and 40 operating, respectively, in conjunction with the base transceiver stations 16 (of which there may be many per backhaul gateway 30) and the base station controller 18. The backhaul gateways 30 and 40 are operable to receive, as will be explained herein, the data communications traffic 23 from the various BTSs 16 for transmission in a common protocol format as data communications traffic 26 over the backhaul link 24 to reduce or minimize bandwidth requirements of this backhaul link 24.

Figure 2:
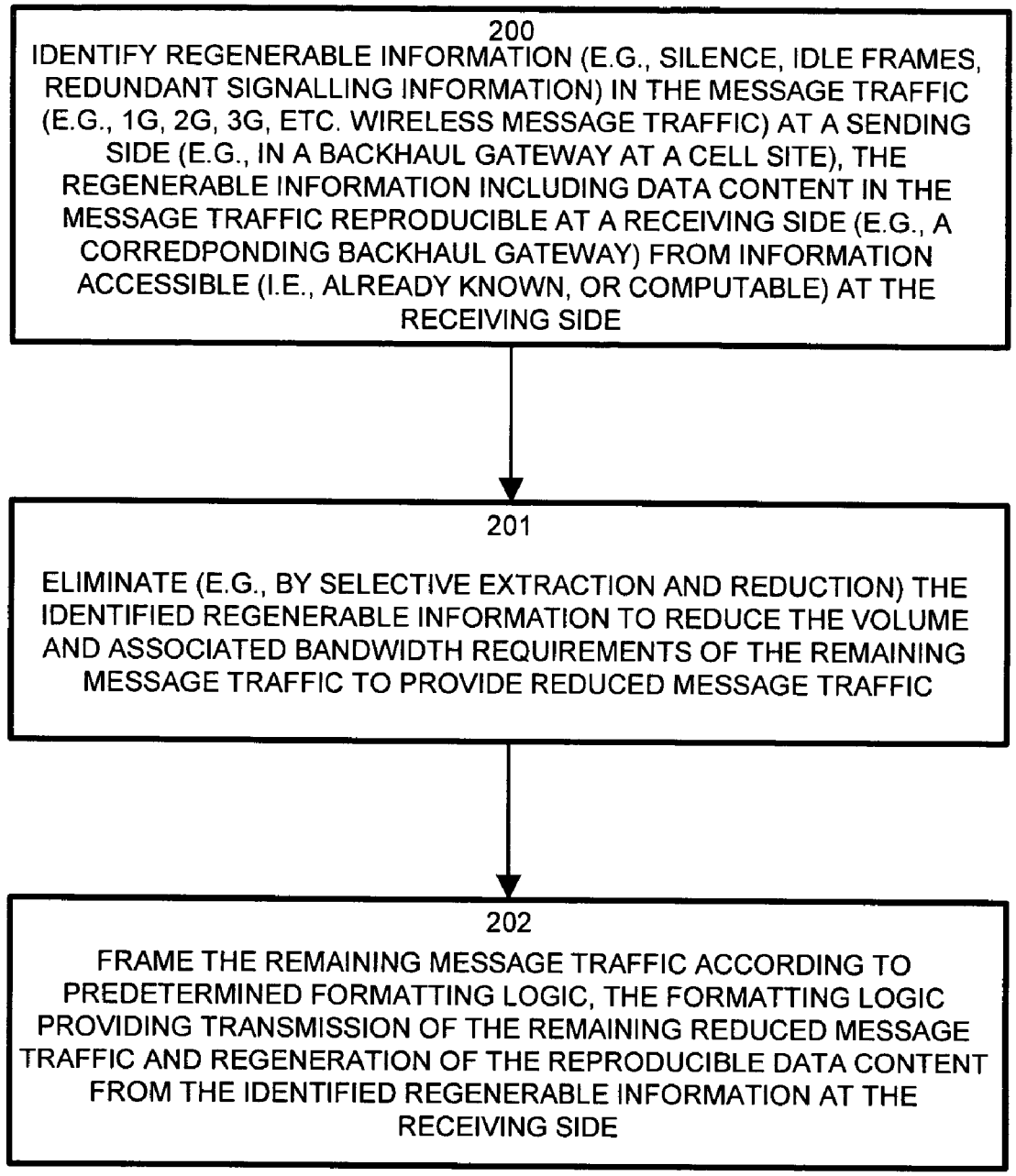
FIG. 2 is a flowchart of a method for aggregating and reducing message traffic across the backhaul gateway device of FIG. 1.

FIG. 2 is a flowchart of a method for aggregating and reducing message traffic across the backhaul link 24, as performed by a backhaul gateway 30 of FIG. 1. Referring to FIGS. 1 and 2, at step 200, the BTS 16 (i.e., operating the backhaul gateway 30) at a cell site 28 (FIG. 3, below) on a sending side identifies regenerable information in the message traffic 23 (i.e., traffic 23 originating from user devices 12 and sent from the BTSs 16 to the backhaul gateway 30) at the sending side. The regenerable information includes data content in the message traffic 23 reproducible at a receiving side from information accessible at the receiving side, or that the receiving side backhaul gateway 40 can reproduce based on communications 26 formatted in the common protocol format of this invention. The backhaul gateway 30 receives message traffic 23 in an uplink direction, towards the BSC 18, and identifies information therein which can be regenerated at the receiving side backhaul gateway 40.

At step 201, the cell site eliminates the identified regenerable information to reduce the volume and associated bandwidth requirements of the remaining message traffic to provide reduced message traffic. The reduced message traffic is message traffic which the cell site has eliminated, or extracted, from the message to reduce the resulting volume of the reduced message traffic for transmission. Accordingly, fewer transmission resources are needed to transmit.

At step 202, the backhaul gateway 30 employs the backhaul protocol to frame the remaining message traffic 23 according to predetermined formatting logic (to be explained). The formatting logic provides transmission of the remaining reduced message traffic 26 and regeneration of the reproducible data content from the identified regenerable information at the receiving side 40. The formatting logic in the backhaul gateway 30 specifies the semantics and structure of the backhaul protocol, and is applicable to the various message traffic 23 types which the backhaul gateway 30 receives, described further below. The backhaul gateway 30 then transmits the formatted message traffic 26 (i.e., formatted in the common protocol format or backhaul protocol) to the complementary backhaul gateway 40 for transmission to the BSC 18 at the other side of the backhaul link 24.

Figure 3:
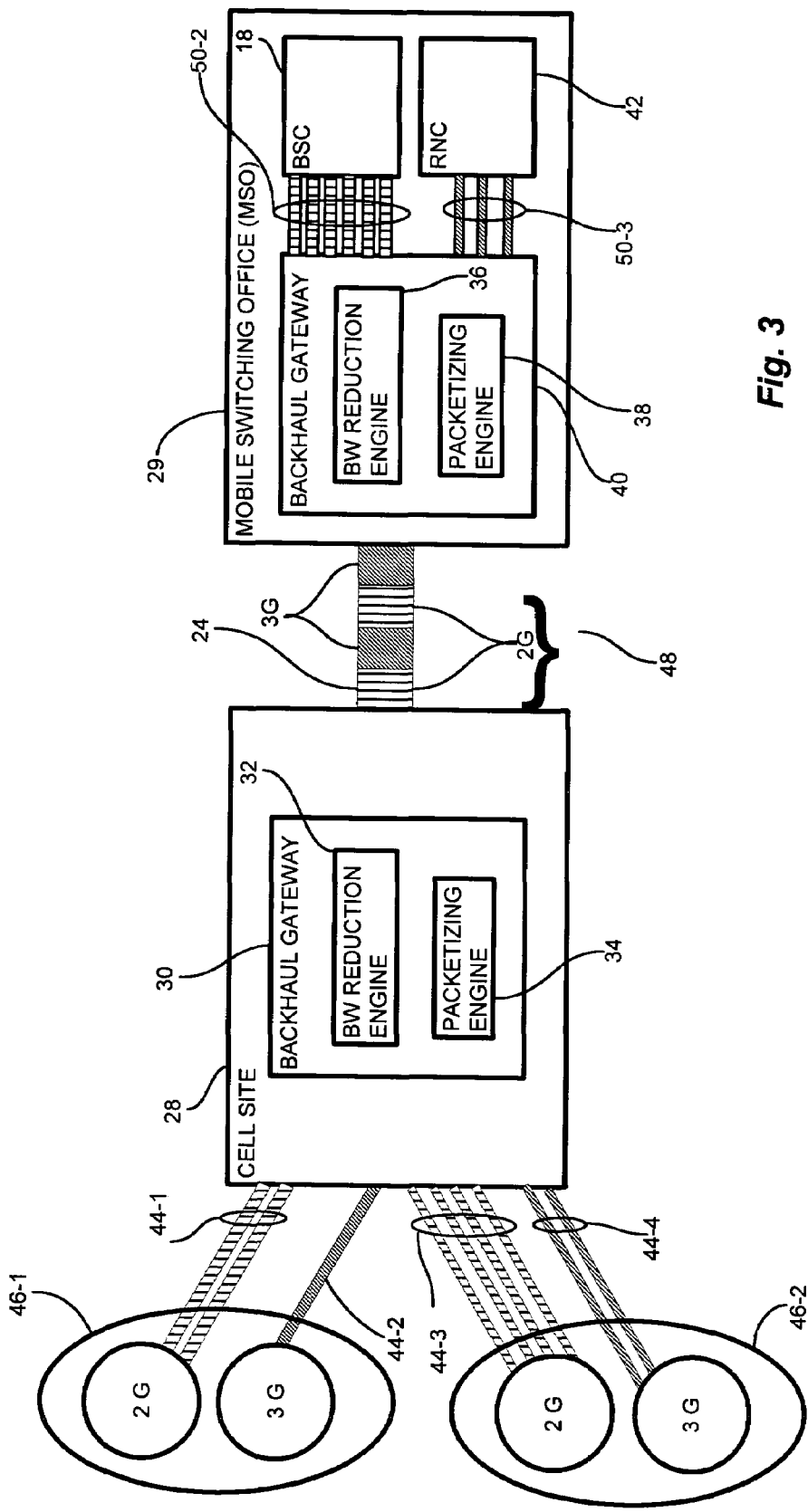
FIG. 3 shows a block diagram of backhaul gateway devices as defined herein interconnecting the backhaul link of FIG. 1.

FIG. 3 shows a block diagram of backhaul gateway devices 30, 40 as defined herein interconnecting the backhaul link 24 of FIG. 2. Referring to FIG. 3, the cell site 28 includes a backhaul gateway 30. The backhaul link 24 connects to a mobile switching office (MSO) 38 including a backhaul gateway 40 on the uplink side toward the wired network. The MSO 38 includes the BSC 18 and a radio network controller (RNC) 42 for receiving ATM message traffic, discussed further below. Alternatively, depending on the network demand, both the BSC and RNC may not be required, as a 2G implementation may require only a BSC or other similar device. Each backhaul gateway 30, 40 includes a bandwidth reduction engine 32, 36 and a packetizing engine 34, 38, respectively. The cell site 28 may maintain a plurality of traffic type specific links 44 to antenna sites 46-1, 46-2 (46 generally). Each of the antenna sites 46-1, 46-2 represents a BTS 16 (as shown in FIG. 1) that uses antennas 25 for maintaining wireless links 13 for the types of traffic it carries. Exemplary 2G 14b and 3G 14c traffic types are shown for clarity, however other traffic types as shown in FIG. 1 are supportable.

The cell site 28 connects to the antenna sites 46 (arrays) via the wireless links 44. In the example shown, the cell site 28 employs 2 2G links 44-1 and 1 3g link 44-2 to the antenna site 46-1. Similarly, the site 28 employs four 2G links 44-3 and two 3G links 44-4 to the antenna array 46-2.

In operation, the wireless links 46 provide connections from each of the antenna sites to the cell site 28. The wireless links 46 transmit message traffic corresponding to the end user wireless links 13 (FIG. 1) and adhering to a wireless protocol, such as GSM, GPRS, WCDMA, and other protocols as are know to those skilled in the art. The BTS 16, or an analogous device, allocates wireless channels and message traffic queuing to accommodate interference, power control issues, and handoffs according to the wireless protocol.

The backhaul gateway 30 operates between the BTS 16 and the backhaul link 24 for reducing message traffic volume. The backhaul gateway includes at least one bandwidth reduction engine 32 and at least one packetizing engine 34, for processing message throughput over the backhaul link 24, discussed further below. The backhaul link 24 carries message traffic 48 according to a backhaul protocol encapsulating data in a common protocol format for aggregating and reducing the message traffic, also discussed further below.

The message traffic 48 over the backhaul link includes the aggregated, reduced traffic 50-2 and 50-3, occupying less bandwidth and operable to be carried on fewer physical lines, than its counterpart, unreduced, message traffic 44. At the remote backhaul gateway 40, in the MSO 29 serving a plurality of cell sites 28, the packetizing engine 38 and bandwidth reduction engine 36 invert the aggregation and reduction of the aggregated backhaul protocol. The backhaul gateway 40, therefore, reframes the message traffic to the original form corresponding to the wireless links 44, and forwards the message traffic 48 to a corresponding BSC 18 for 2G traffic 50-2, or Radio Network Controller (RNC) 42 for 3G traffic 50-3.

Figure 4:
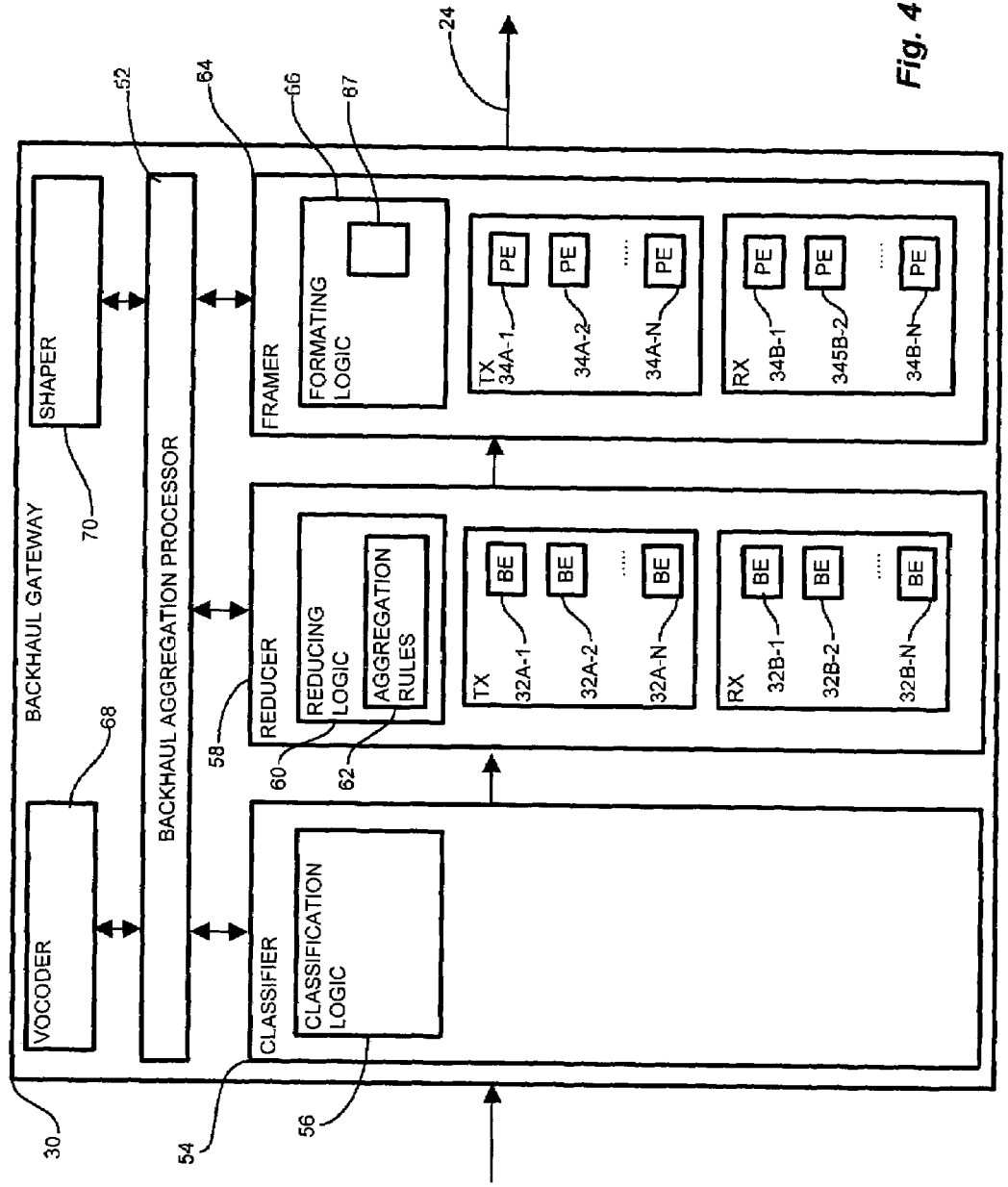
FIG. 4 shows a block diagram of a backhaul gateway device of FIG. 3 in greater detail.

FIG. 4 shows a block diagram of a backhaul gateway device 30 of FIG. 3 in greater detail. Referring to FIGS. 3 and 4, the backhaul gateway 30 includes a classifier 54 having classification logic 56, a reducer 58 including reducing logic 60, aggregation rules 62, and bandwidth reduction engines 32, and a framer 64 having formatting logic 66, including an object instantiating the backhaul protocol 67, and packetizing engines 34. Both the bandwidth reduction engines 32 and the packetizing engines 34 include a plurality of compression 32 and packetizing 34, specifically bandwidth reduction engines 32 for transmission 32A-1 . . . 32A-N, and receive 32B-1 . . . 32B-N, and packetizing engines 34 for transmission 34A-1 . . . 34A-N and receive 34B-134B-N. The device 30 also includes a backhaul aggregation processor 52, a vocoder 68 and a shaper 70.

In operation, the classifier 54 receives the message traffic 44 from the BTS 16, and applies classification logic 56 to determine the traffic type of the message traffic 50. Depending on the traffic type, the backhaul aggregation processor 52 applies the corresponding operations and functions to encode and decode the backhaul protocol 67. The backhaul protocol 67, therefore, provides a common packet format between each pair of backhaul gateways 30, 40 for the various message traffic types which travel across the backhaul link 24. The reducer 58 receives the classified message traffic 44, and applies reducing logic 60, depending on the classification. The reducing logic 60 employs aggregation rules 62, described further below, to determine and apply the reduction and aggregation operations to extract and remove recreatable information from the message traffic 44. A vocoder 68 may be employed to operate on speech data types to encode such speech data from a sequence of user message packets corresponding audible (spoken) data, such as reducing digitized G.711 voice from a 1G analog radio system. The bandwidth reduction engines 32A collectively process the data according to the aggregation rules 62. A shaper 70 performs optional traffic shaping during peak demand (throughput) by prioritizing message traffic to the reducer 58 based on delay tolerance for the message traffic type, described further below. The framer 64 receives the reduced, aggregated message traffic 44 from the reducer 58, and frames it into packets according to the backhaul protocol 67. The formatting logic 66 controls the formatting of the reduced message traffic 44 according to the backhaul protocol 67, and invokes the packetizing engines 34A to reformat the message traffic 44 for transmission to the remote backhaul gateway device 40.

The discussion herein focuses on the transmission side of the backhaul gateway device 30. Analogous and complementary operations occur in the backhaul gateway device 40 at the opposed side of the link 24, via the receive bandwidth reduction engines 32B and packetizing engines 34B.

Figure 5:
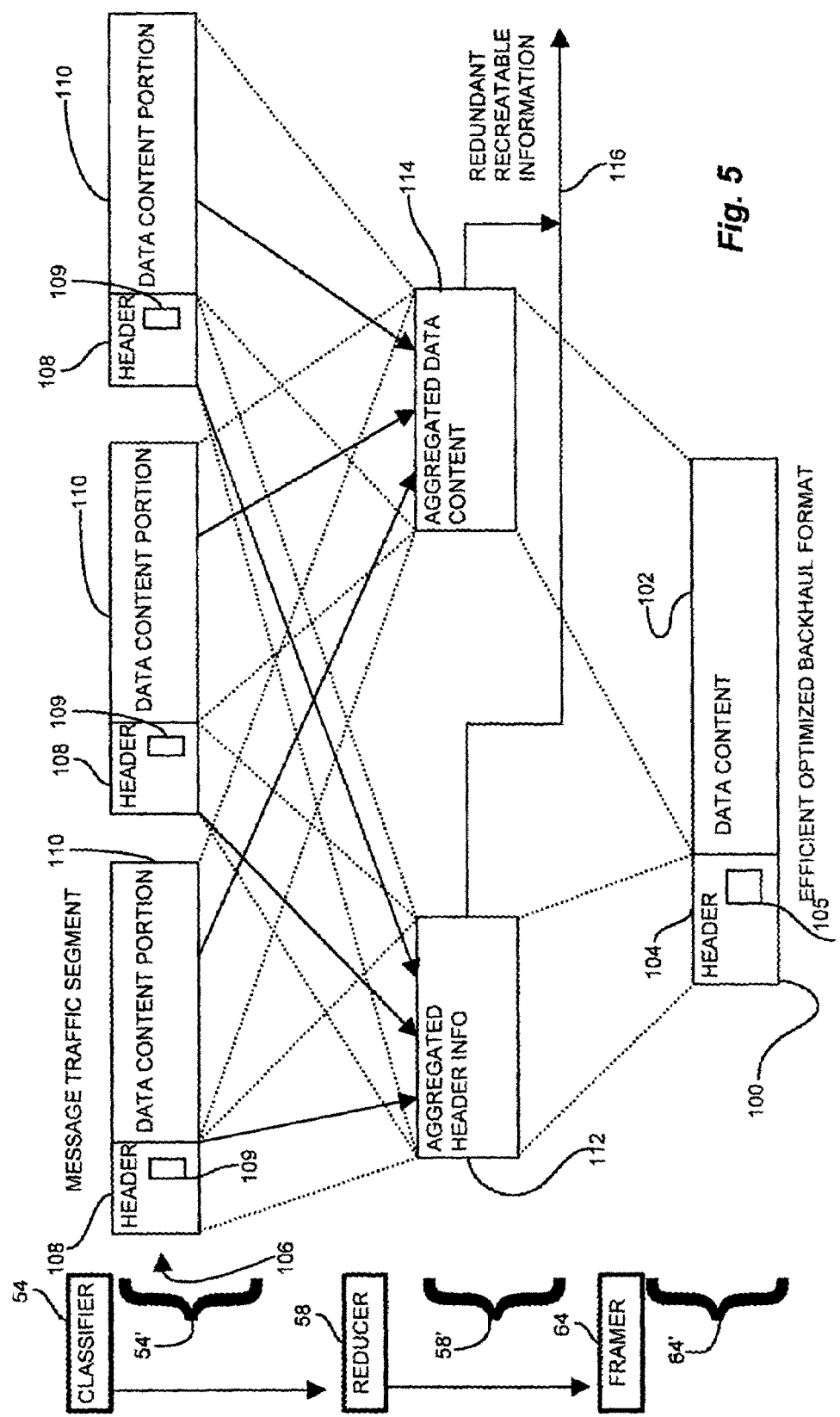
FIG. 5 shows a data flow diagram of mapping, aggregating and reducing message traffic in the backhaul gateway device of FIG. 4.

FIG. 5 shows a data flow diagram of mapping, aggregating and reducing message traffic in the backhaul gateway device of FIGS. 3 and 4. Referring to FIGS. 4 and 5, the backhaul gateway 30 receives message traffic 44, in a particular arrangement, as a sequence of message packet segments 106, or message traffic packets, as in GSM TRAU (Transcoding and Rate Adaptation Unit) frames, a TCP/IP transmission, or ATM cells, as are known in the art. Such message traffic segments 106 typically include a control portion, or header 108, having a message traffic type 109, and a data portion, or payload 110. The control portion 108 includes information such as data payload identity, switching node identity, timing criteria, Quality of Service (QOS), Virtual Path/Virtual Connection identifiers (VPI/VCI), and error correction, such as Forward Error Correction (FEC) information. The data portion 110 includes the data from the user 14n which is to arrive at the destination. Both types of information may be reduced and aggregated. The classifier 54 identifies and dispatches the header 108 and data content portions 110 to the reducer 58, shown generally by 54.'

The efficient, optimized backhaul protocol 67 includes a packet 100 format also including a header 104 and a data content 102 portion. The reducer 58 gathers information from a plurality of header 108 portions and data content 110 portions, and aggregates data items in the aggregated header info 112 and aggregated data content 114 segments, shown generally as processing 58'. Information from a plurality of user 14n packets 106 may be included in a single aggregated header 112 and data content 114 portion, respectively. Identification of redundant and/or recreatable information, such as data which is repeated or sparse, and reorganization and/or elimination of the identified data results in a reduction in the total data volume to transmit. The identified data 116 is data which may be redundant or recreatable and is extracted, or eliminated, from the resulting backhaul protocol packet 100 for transmission over the backhaul link 24.

The framer 64 organizes 64' the remaining data, which may be either unique, unrecreatable, or otherwise unmalleable, into the backhaul protocol packet 100 format. In this manner, an exemplary three user data packets 106 reduce to a single aggregate packet 100 using the backhaul protocol format 100. An indicator 105, described further below, denotes the regenerable data and the aggregation rules 62 for recreating the reduced and aggregated data 116.

Figure 6:
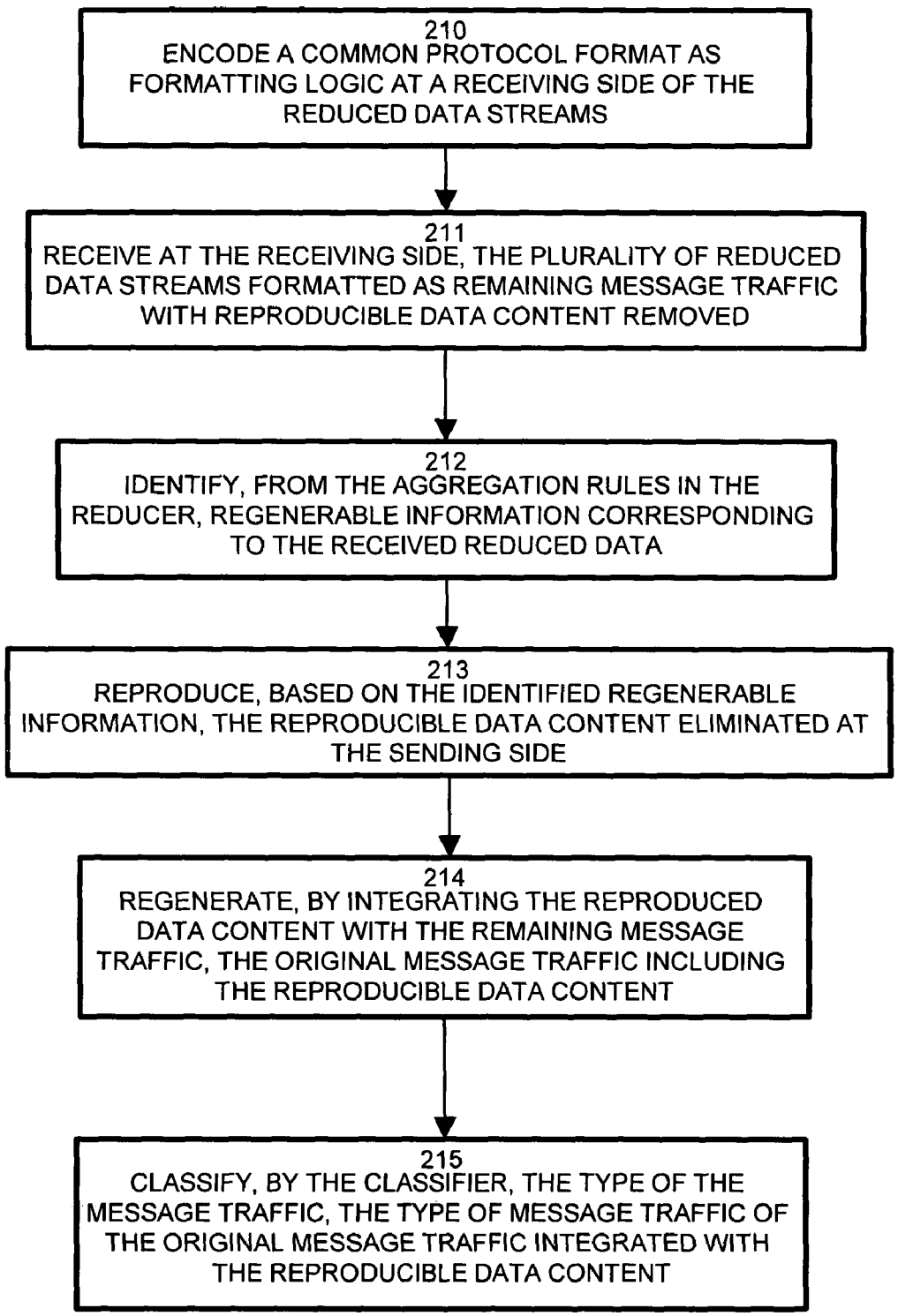
FIG. 6 shows a flowchart of receiving the aggregated and reduced data at the destination backhaul gateway device as in FIG. 4.

FIG. 6 shows a flowchart of receiving the aggregated and reduced data at the destination backhaul device as in FIG. 3. Referring to FIGS. 3, 4, 5 and 6, at step 210 the backhaul gateways 30, 40 initialize by encoding the common protocol format 67 as the formatting logic 66 at a receiving side of the reduced data streams. The common protocol format 67, as described above, allows the common protocol format 67 to transport the aggregated, reduced message traffic sent from the sending backhaul gateway 30. At step 211, the backhaul gateway 40 at the receiving side receives the plurality of reduced data streams formatted according to the common protocol format 67 to include the remaining message traffic with reproducible data content 116 removed. The remaining message traffic 44 is the output from the aggregation and reduction operations, described further below. The framer 64 in the backhaul gateway 40 unframes, according to the formatting logic 66, the reduced data according to the backhaul protocol format. The packetizing engine 38 is conversant with the backhaul protocol 67 and is operable to remove the framing information which the sending packetizing engine 34 applied.

At step 212, the bandwidth reduction engine 32, identifies, from the aggregation rules 62 in the reducer 60, regenerable information 116 corresponding to the received reduced message traffic 44. The regenerable information is that which the sending bandwidth reduction engine 32 eliminated from the message because it determined that it carried information already known, accessible or derivable from the previous message traffic. At step 213, the bandwidth reduction engine 32 reproduces, based on the identified regenerable information, the reproducible data content eliminated at the sending side gateway 30.

At step 214 the reducer generates, by integrating the reproduced data content with the remaining message traffic, the original message traffic including the reproducible data content. At step 215, the classifier classifies the type of the message traffic, the type of message traffic of the original message traffic integrated with the reproducible data content, and forwards the message traffic onto the remote endpoint. The forwarded message traffic corresponds to an original protocol of the original message traffic at the sending side in such a manner that the intervening backhaul protocol reproductions are undetectable to the recipient remote endpoint.

Figure 7:
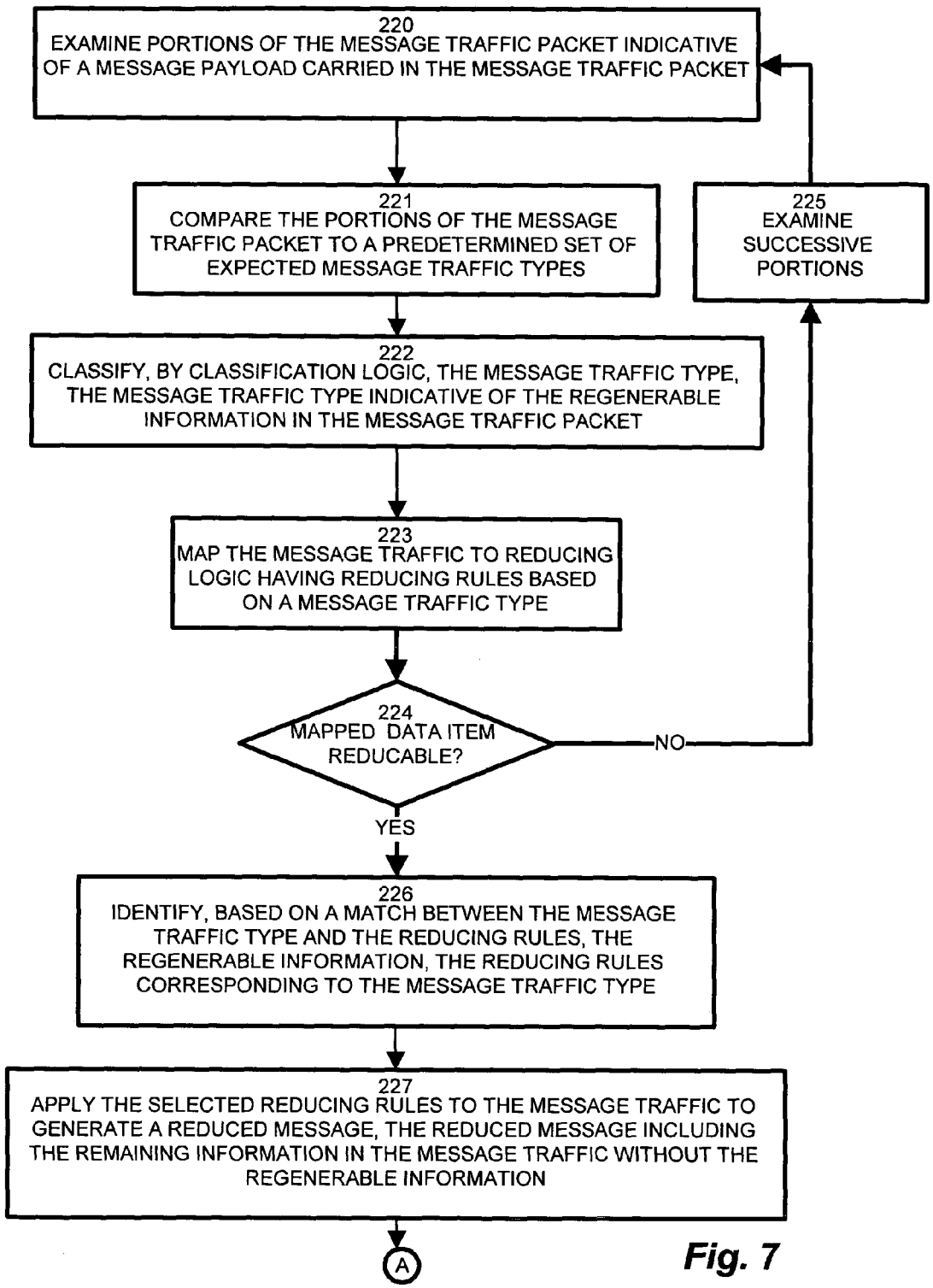
FIGS. 7 and 8 show a flowchart of the backhaul gateway device aggregating and reducing message traffic as in FIG. 2 in greater detail.
Figure 8:
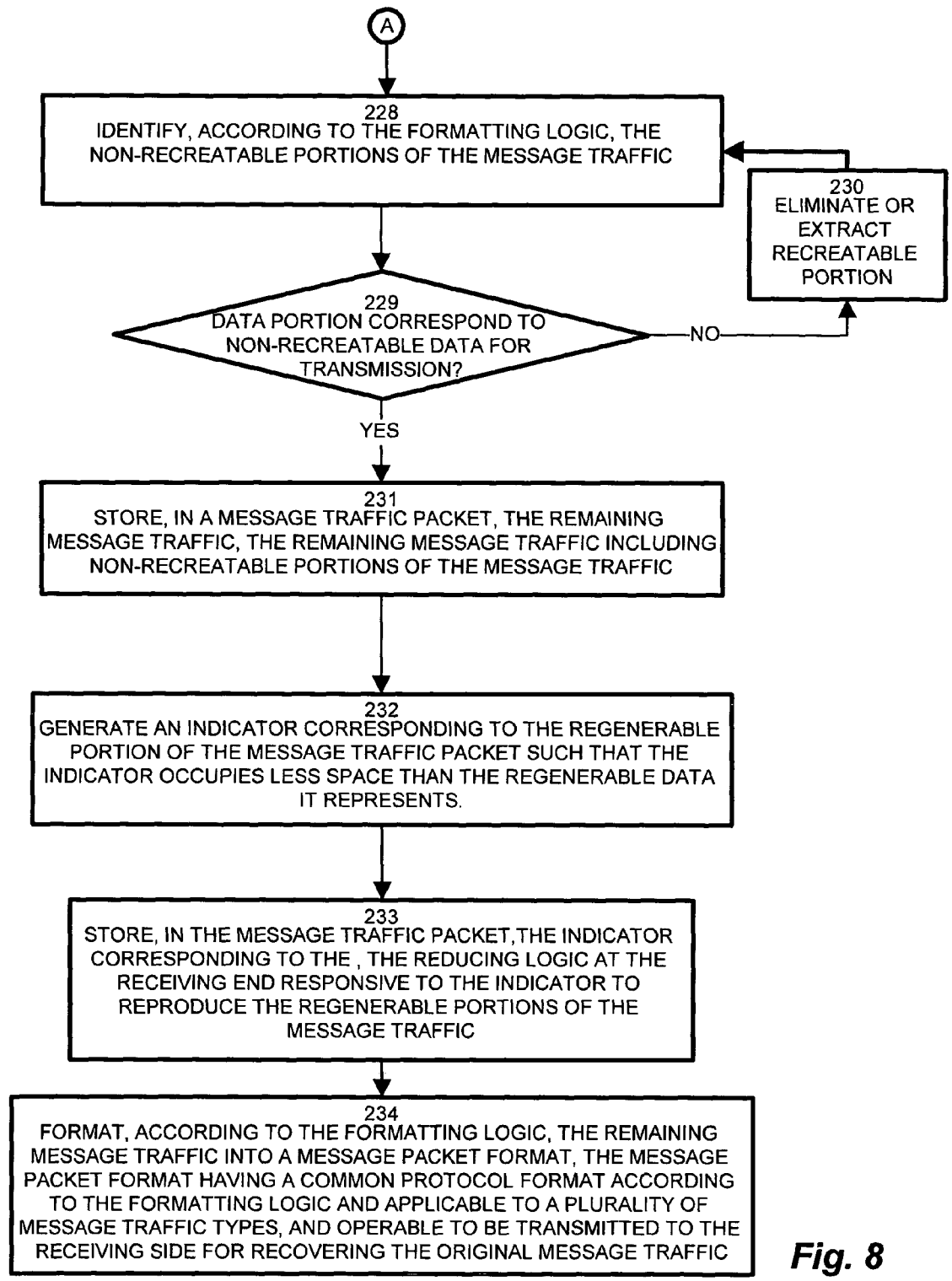

FIGS. 7–8 show a flowchart of the backhaul gateway device aggregating and reducing message traffic as in FIG. 2 in greater detail. Referring to FIGS. 4, 7 and 8, at step 220, the classifier 54 examines portions of the message traffic packet 106 indicative of a message payload 10 carried in the message traffic packet 106. As indicated above, the aggregation method depends on the classification (data type) of the data to be aggregated and reduced. In order to reduce the latency, the aggregation and reduction begins prior to receipt of an entire frame (packet), before receiving the entire packet, also described below with respect to particular classification of data for aggregation and reduction. At step 221, the classifier 54 compares the portions of the message traffic packet 106 to a predetermined set of expected message traffic types 109. Such comparison may be via a lookup in a list of expected message types, for example. At step 222, the classifier classifies, by classification logic 56 in the classifier 54, the message traffic type 109 to enable the reducer to check for regenerable information. Depending on the type of the message traffic 44, different reducing and aggregation rules 62 are applicable.

At step 223, the reducer 58 maps the message traffic 44 to reducing logic 60, the reducing logic 60 having aggregation rules 62 based on a message traffic type 109. At step 224, a check is performed to determine if a particular mapped data item is reducible. If there is no reducible data in the examined portion, control reverts to step 220 to examine successive packets 106 or portions thereof, as depicted at step 225.

If there are reducible portions in the message packet 106, then, at step 226 the reducing logic 60 identifies, based on a match between the message traffic type 109 and the reducing rules, the regenerable information, the aggregation rules 62 corresponding to the message traffic type. At step 227, the reducer 58 applies the selected aggregation rules 62 rules to the message traffic 44 to generate a reduced message 100, the reduced message 100 including the remaining information 102 in the message traffic 44 without the regenerable information 116.

Depending on the protocol or format of the incoming data to the backhaul gateway, certain portions contain regenerable data, in which the message traffic type 109 is indicative of the regenerable information 116 in the message traffic packet 106. The reducer 58, therefore, parses the message traffic 44 to find message traffic types 109 having regenerable information 116 by matching with message traffic types known to have regenerable information 116. For example, a stream of packets 106 carrying voice data typically has segments of silence. Since the silence does not need to be transmitted over the backhaul link 24, identification and elimination of the silence reduces and allows aggregation of the substantive voice portions.

The framer 64 frames the non-recreatable data for transmission according to the backhaul protocol 67. At step 228, the framer 64 identifies, according to the formatting logic 66, the non-recreatable portions of the message traffic 44. At step 229, a check is performed to determine if a particular portion corresponds to non-recreatable data for transmission. If a particular portion is not for transmission, that portion is eliminated 116 or extracted, as depicted at step 230, and control reverts to step 229 for successive data.

The remaining message traffic following the check at step 229 corresponds to non-recreatable data for transmission. If the message packet 106 or portion thereof is non-recreatable data, according to the check at step 229, than at step 230 the formatting logic stores, in a message traffic packet 100, the remaining message traffic, the remaining message traffic including non-recreatable portions of the message traffic. At step 231, the formatting logic 66 generates an indicator 105 corresponding to the regenerable portion 116 of the message traffic packet such that indicator 105 occupies less space than the regenerable data it represents. The backhaul protocol 67 defines the indicator 105 such that the receiving backhaul gateway 40 may interpret the indicator 105 in a manner to enable recreation of the data it represents. Transmission bandwidth is saved because the indicator occupies less space than the recreatable data it represents.

At step 232, the framer 64 stores, in the message traffic packet 100, an indicator 105 corresponding to the regenerable portion 116 of the message traffic packet 100, the reducing logic 60 at the receiving end responsive to the indicator 105 to reproduce the regenerable portions 116 of the message traffic 44. At step 233, the framer 64 formats, according to the formatting logic 66, the remaining message traffic into the message packet format, the message packet format having a common protocol format 67 (backhaul protocol) according to the formatting logic 66 and applicable to a plurality of message traffic types 109, and operable to be transmitted to the receiving side for recovering the original message traffic 106.

The common protocol format 67 carrying data over the backhaul link 24, or backhaul protocol, conforms to a range of expected message traffic types to enable reducing and aggregating of the arriving wireless message traffic. The aggregation rules 62 and formatting logic 66 apply to the range of expected message traffic types to provide a general backhaul protocol 67 applicable to the various message traffic types 109. Reduction and aggregation of exemplary message traffic types is discussed further below with respect to FIGS. 9–17.

FIG. 9 shows the aggregation rules 62 in the backhaul gateway device of FIG. 4 in greater detail. Referring to FIG. 9, the aggregation rules table 72 includes entries 71 corresponding to the message traffic 44. A message traffic type field 76 maps from the message traffic type 109 from the classifier 54. Each of the entries 71 includes parameters 74 indicative of operations for handling message traffic 50 of the particular type 76. Exemplary parameters 74 include an operation name 74A and an operation reference 74B for transferring control to the operation. Other parameters may be included in the table 72 in alternate configurations.

The aggregation operations referenced by the parameters 74 include the instructions for analyzing and determining recreatable data 116. For example, in a 2G speech scenario, an aggregation operation would determine which one of three types of speech data, either voice, silence, or idle, exists in a segment and then parses the data to eliminate the idle segments and a portion of the silence (background noise) segments.

Clarifying, now, the type specific state machines performing type-specific processing will now be discussed with respect to FIGS. 10–17. Such type specific processing occurs via an aggregation process in the bandwidth reduction engines 32 in response to the aggregation processor. In a typical implementation of this speech scenario process, for example, on a GSM TRAU frame that is carrying a 16 Kbps GSM voice channel, there are 20 ms frames that may be generally deemed to carry voice or silence information. The voice information typically fills most of the frame. The silence information occupies only a small fraction of the frame with the rest of the frame being redundant or "don't care."

If, on a particular channel, there is a series of voice frames followed by some silence frames, processing starts in the "voiced" state, sending all the bits for the voice frames and for the beginning of the first silence frame. But as the silence frame progresses, the aggregation processor 52 rapidly identifies it as silence and transitions into the "silence" state. In response to this change of state, the aggregation processor 52 forwards a state change indicator to the aggregation process. Thereafter, as long as processing remains in the silence state, the aggregation processor 52 forwards zero bits to the aggregation process.

In terms of aggregation efficiency, a certain amount of overhead is required for each lump of aggregated data. Accordingly, bandwidth efficiency may be improved by sampling the state machines at widely spaced intervals, thus generating a minimum number of lumps of aggregated data. On the other hand, low latency is a critical competitive advantage, so it is beneficial to sample the state machines frequently, thus minimizing the delay from data arrival until an aggregated lump of data is forwarded.

However, the granularity of the decision process that watches each channel throughout the processing intervals allows an optimal trade-off between bandwidth saving and latency. More importantly, the backhaul gateway 30, 40 is able to set the fixed time interval for the aggregation process (bandwidth reduction engine 32) to as short as two milliseconds and still achieve nearly a 2 to 1 bandwidth saving on typical GSM traffic. For example, with a two millisecond aggregation interval (and a corresponding 2 ms latency at the other end) the total system latency can be below 5 ms while providing substantial bandwidth reduction, or savings.

FIG. 10 shows reduction of speech message packets in the backhaul gateway device of FIG. 4. Referring to FIG. 10, a synchronous series of speech data frames 78 is shown. The speech frames 78A–78I, in this example, each include 20 ms duration of speech data. The reducer 58 maps the speech frame data 78 to message packets 80 and 82 in the common protocol format 67 for transport over the backhaul link 24. The voice data, as shown in frames 70A, 70G, and 70H, map to message packets 80, 82. Each backhaul protocol packet 80, 82 stores 17 ms of speech data, hence the first 17 ms of speech data maps to the payload portion 80B of the packet 80. The remaining 3 ms map to the payload portion 82B, as shown in FIG. 10, as will be described in further detail below with respect to FIG. 11.

A portion of the ms corresponding to the silence frames 78B, 78C, 78F, and 78I maps into the packet 82B, as portions 82B-2, 82B-3, and 82B-6. Idle portions 78D and 78I, corresponding to periods of no speech signals, are not carried and the reducer 58 represents these potions with a placeholder 82B-4, 82B-5.

Figure 11:
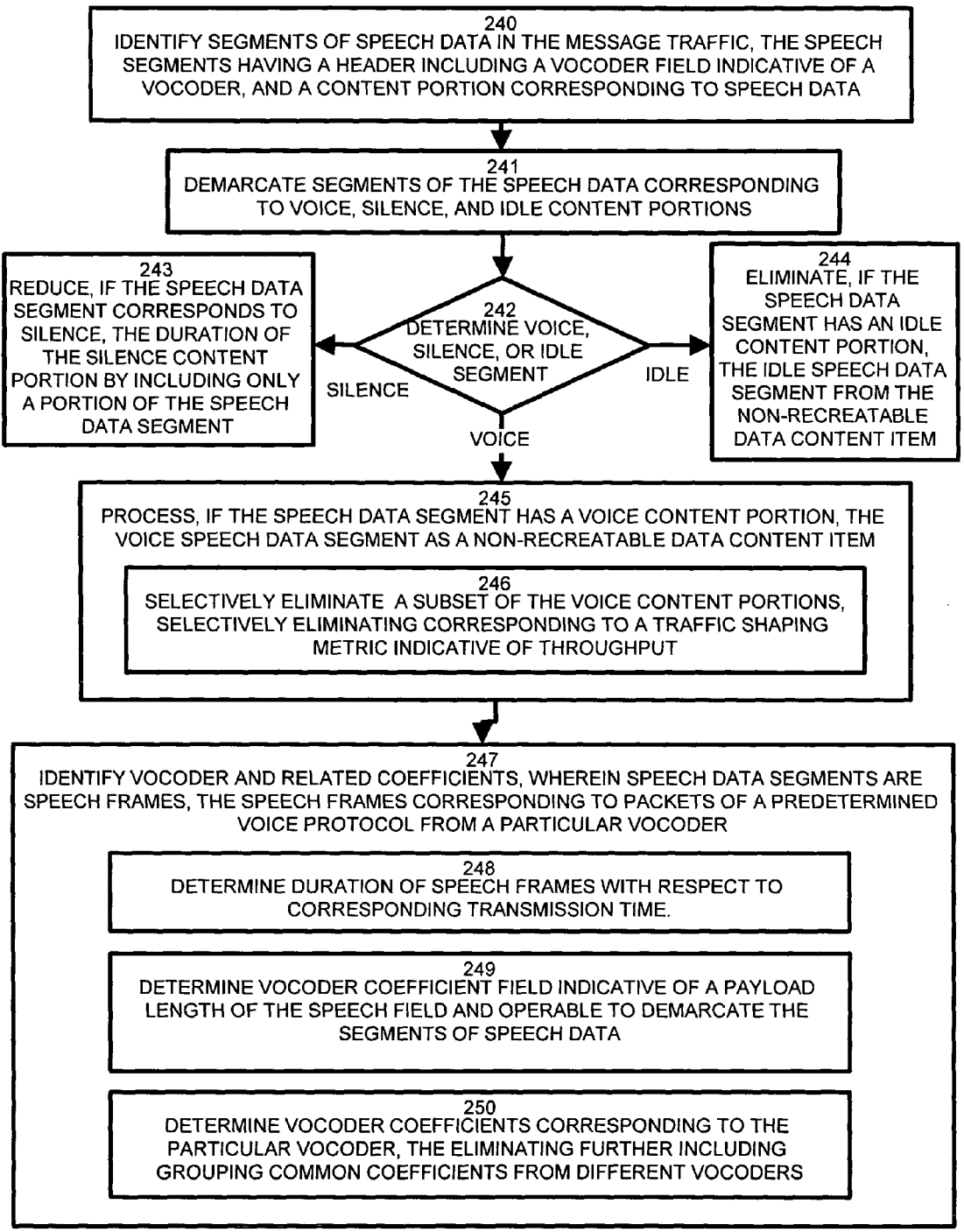
FIG. 11 shows a flowchart of reduction of voice message packets in the backhaul gateway device as in FIG. 10.

FIG. 11 shows a flowchart of reduction of speech message packets 78 in the backhaul gateway device 30 as in FIG. 10. Referring to FIG. 11, for a message traffic stream 106 of voice data, the identifying further includes, at step 240 identifying segments 78 of speech data in the message traffic 44, the speech segments 78 having a header including a vocoder field indicative of a vocoder, and a content portion corresponding to speech data. At step 241, the reducer demarcates segments of the speech data corresponding to voice, silence, and idle content portions. A check is performed, at step 242, to determine if the speech data corresponds to voice, silence, or idle segments 78.

If the speech data segment 78 corresponds to silence, at step 243, the eliminating further includes reducing, the duration of the silence content portion by including only a portion of the speech data segment. In the case of transmission of silence, background noise is still present and is reproducible to maintain the continuity of the speech data stream. Accordingly, some of the background noise speech data is included as part of the non-recreatable data portion. Control then reverts to step 241 for the next segment 78 of speech data. If the speech data segment 78 has an idle content portion, at step 244, the reducer eliminates the idle speech data segment 78 from the data content item, and resumes at step 241 for the next segment of speech data.

If the speech data segment 78 has a voice content portion, then the reducer 58 processes the voice speech data segment as a non-recreatable data content item which the gateway transmits across the backhaul link 24. During periods of peak demand, at step 246, processing the speech data segment further includes selectively eliminating a subset of the voice content portions, selectively eliminating corresponding to a traffic shaping metric indicative of throughput. The traffic shaping metric, described further below, identifies data content according to a loss tolerance. In the case of speech data, a certain degree of loss is tolerable, as it will appear either undetectable or as slight static to the end user.

As indicated above, the entire speech message packet need not be received prior to commencing classification and reduction processing. In a particular configuration, the aggregation rules perform a predictive check on a speech indicator bit to detect a transition to speech packets. In a case where certain earlier received bits are indicative of a speech packet (data segment), the earlier bits are interpreted as "spoofing" the later received speech indicator bit to begin speech processing on the corresponding speech data segment.

At step 247, the aggregation processor 52 identifies vocoder 68 and related coefficients, in which the speech data segments are speech frames 78 corresponding to packets 106 of a predetermined voice protocol from a particular vocoder 68. The processing by the reducer includes recognizing the coefficients of the particular vocoder 68. At step 248, the aggregation processor 52 determines the duration of the speech frames 78 with respect to the corresponding transmission time, such as 20 ms.

At step 249, the aggregation processor 52 determines a vocoder 68 coefficient field indicative of a payload length of the speech field and is operable to demarcate the segments of speech data. Once determining the length of the payload length, at step 259, the aggregation processor 78 determines vocoder coefficients corresponding to the particular vocoder, and eliminating further comprises grouping common coefficients from different vocoders. For example, as in FIG. 10 above, the vocoder 68 payload field corresponds to 20 ms of speech time, while the backhaul protocol stores 17 ms in a particular packet.

Since the vocoder 68 coefficient fields are repeated from speech segment 78 to speech segment 78, and typically do not change frequently, most such fields are recreatable data 116. The backhaul protocol 67 need only indicate a change in the vocoder coefficient fields. Static values are recreatable data which the backhaul gateway 30 need not transmit across the backhaul link 64.

Figure 12:
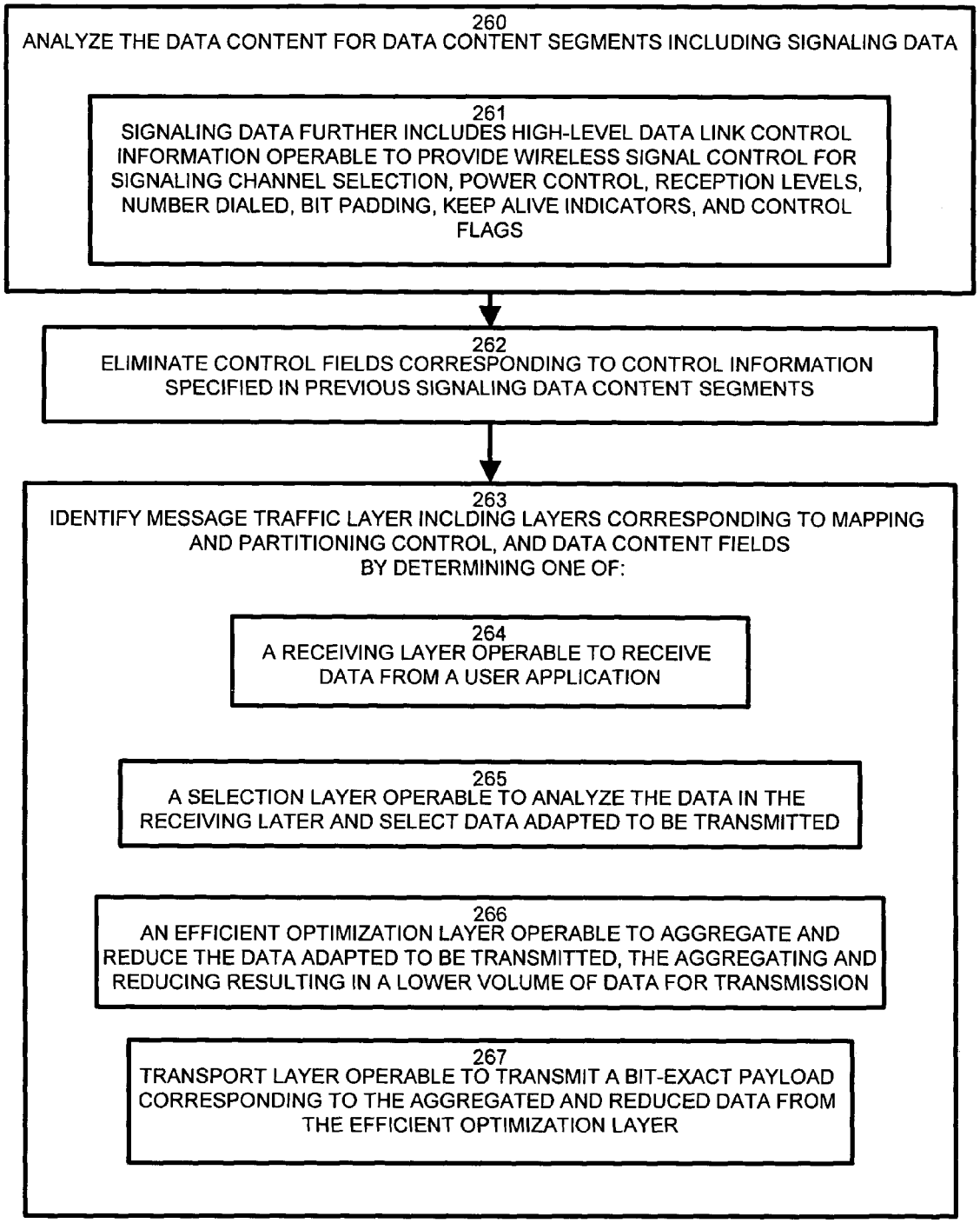
FIG. 12 shows a flowchart of signaling aggregation in the backhaul gateway device as in FIG. 11.

FIG. 12 shows a flowchart of signaling aggregation in the backhaul gateway device of FIG. 4. Referring to FIG. 12, at step 260, the identifying further comprises analyzing the data content for data content segments including signaling data. At step 261, the reducer scans for signaling data, which further includes high-level data link control information operable to provide wireless signal control for wireless parameters such as signaling channel selection, power control, reception levels, number dialed, bit padding, keep alive indicators, and control flags. Signaling data is control information concerning wireless communications and includes data for power control, timing reference, channel requests, power control groups, and other wireless parameters. At step 261, the eliminating further comprises eliminating such control fields corresponding to control information specified in previous signaling data content segments.

At step 263, the reducer 58 analyzes data corresponding to each of several layers, wherein the message traffic further comprises a plurality of layers, the layers corresponding to mapping and partitioning control, and to data content fields. Such layers further include, at step 264, a receiving layer operable to receive data from a user application; at step 265 a selection layer operable to analyze the data in the receiving later and select data adapted to be transmitted; at step 266, an efficient optimization layer operable to aggregate and reduce the data adapted to be transmitted, the aggregating and reducing resulting in a lower volume of data for transmission; and at step 267, a transport later operable to transmit a bit-exact payload corresponding to the aggregated and reduced data 100 from the efficient optimization layer.

Figure 13:
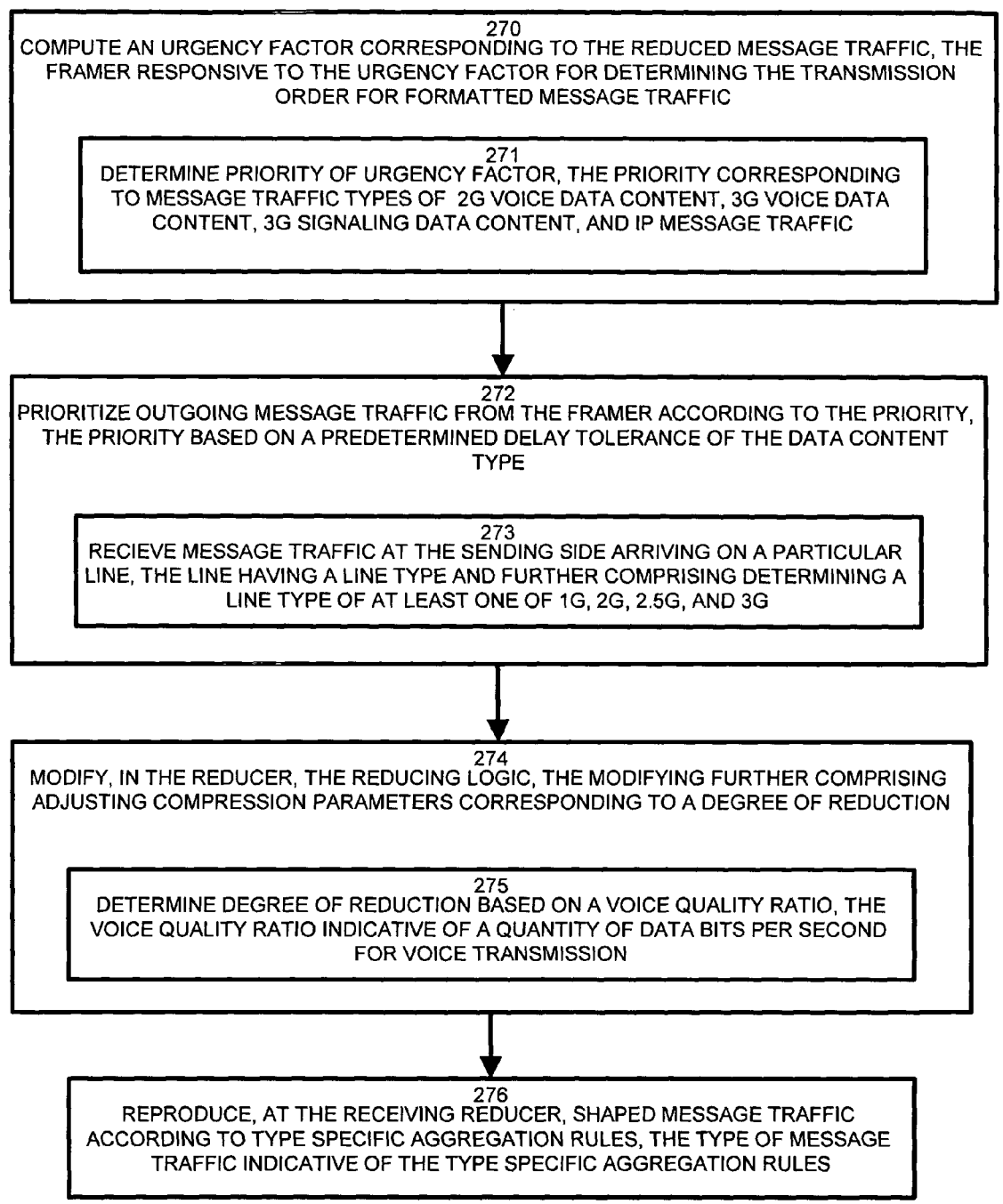
FIG. 13 shows a flowchart of traffic shaping in the shaper of FIG. 4.

FIG. 13 shows a flowchart of traffic shaping in the shaper of FIG. 4. Traffic shaping prioritizes message throughput by distinguishing message traffic 44 which is more delay and/or loss tolerant than other types of traffic. In the voice description above, for example, voice data loss results in brief incoherent speech, rather than catastrophic failure or inaccuracy as is possible in the case of data. Further, certain protocols, such as TCP/IP, support end-to-end recovery by retransmission parameters to accommodate outright packet loss. Other metrics for delay and loss tolerance may be implemented.

Referring to FIGS. 13 and 4, at step 270, the framer 64 computes an urgency factor corresponding to the reduced message traffic, the framer responsive to the urgency factor for determining the transmission order for formatted message traffic. The framer 64 computes the urgency factor based on the delay tolerance of the message traffic type 109. At step 271, the framer 64 computes the urgency factor based on the priority corresponding to message traffic types 109 of 2G voice data content, 3G voice data content, 3G signaling data content, and IP message traffic. The framer 64 may also apply other tiers of criteria to refine the priorities.

At step 272, the framer 64 prioritizes the outgoing message traffic 48 according to the computed priority, the priority based on a predetermined delay tolerance of the data content type. The framer 64 transmits less loss tolerant traffic types first, while queuing more delay tolerant message types. In the case of message traffic 44 supported by end-to-end retransmit capability, such as TCP/IP, extreme demand may involve dropping certain message packets. Prioritizing includes identifying the incoming message traffic 44 for backhaul transmission by different physical lines 44 serving different traffic types 109. Accordingly, at step 273, message traffic 44 at the sending side arrives on a particular line 44, the line having a line type and further comprising determining a line type of at least one of 1G, 2G, 2.5G, and 3G.

At step 274, the reducer 58 modifies reducing logic 60, the modifying further comprising adjusting compression parameters 74 corresponding to a degree of reduction. If the traffic shaping by the framer 64 does not mitigate excessive throughput demands, the reducer 58 is operable to apply more aggressive bandwidth management and reduction techniques. A voice quality ratio applies to a degree of loss of voice data. As indicated above, loss of voice data results in momentary sound quality degradations to the end user. Accordingly, at step 275, the degree of reduction is determined by a voice quality ratio, the voice quality ratio indicative of a quantity of data bits per second for voice transmission. More aggressive reduction allows a lower voice quality ratio, therefore consuming less bandwidth (bits) per each speech segment 78.

At step 276, at the receiving side, reproducing the shaped traffic includes reproducing according to type specific aggregation rules, the type of message traffic indicative of the type specific aggregation rules. Therefore, the receiving backhaul gateway 40 applies inverse traffic shaping operations to complement the sending traffic shaping operations. In the case of speech data, for example, a change in the voice quality ratio involves interpreting, by the receiving side, fewer bits per unit increment (segment) of speech data.

Figure 14:
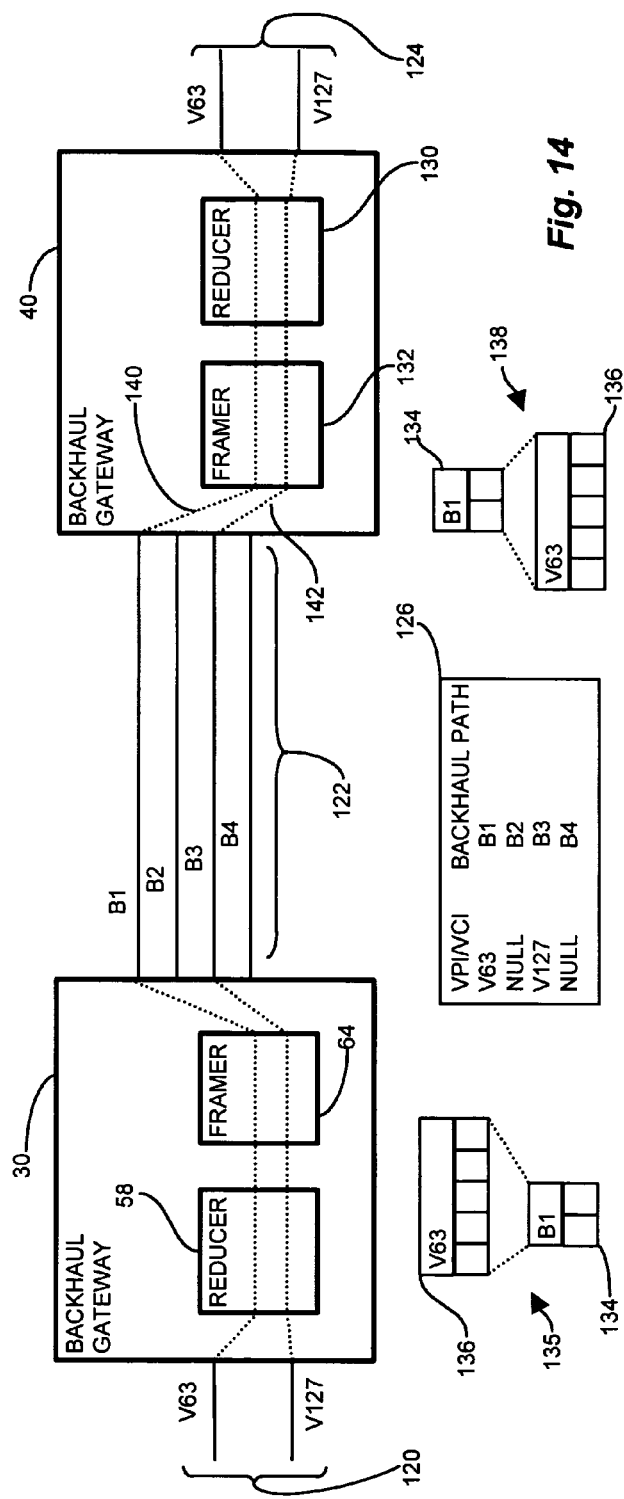
FIG. 14 shows ATM header compression in the backhaul gateway device of FIG. 4.

FIG. 14 shows ATM header compression in the backhaul gateway device 30 of FIG. 4. Referring to FIG. 14, the operations involving ATM header compression include the reducer 58, the framer 64, and a plurality of backhaul ATM virtual connections 122. A plurality of ingress ATM lines 120 connects to the backhaul gateway at one end of the backhaul link 24, and a plurality of egress ATM lines 124 connect to the backhaul gateway 40 at the opposed side of the backhaul link 24.

The ingress ATM lines may be numerous, as shown by the exemplary VPI/VCI indicators of V63 and V127. A typical ATM cell has 24 bits for specification of such a VPI/VCI, allowing for many possible permutations for the VPI/VCI selection. The backhaul gateways 30, 40, in contrast, establish four backhaul paths 122, shown as B1–B4, therefore requiring many fewer bits to specify the transport path. A mapping table 126 maps the ATM indicators V63, V127 to the backhaul paths 122.

In operation, ingress ATM message traffic arrives at the ingress links 120. In the exemplary configuration, traffic arrives on ingress line 120 V63 and V127. The reducer extracts the 5 byte ATM header for the V63 and V127 designations, and maps these threads to the backhaul paths B1 and B3 respectively, as shown by dotted lines 128 and 130. The reducer 58 updates the mapping table 126 to indicate that the backhaul link B1 carries V63 and that B3 carries V127. The framer then builds the backhaul protocol packet by extracting the 5 bit VPI/VCI ATM header 136 and replacing it with the 2 bit backhaul link identifier 134 to form an effective reduced, or compressed, ATM header, shown by address map 135. At the receiving backhaul gateway 40, the framer 130 reads the backhaul link identifier B1–B4, corresponding to the compressed ATM header. The reducer then references the mapping table 126, and determines the VPI/VCI designation of the ingress message traffic 120. The reducer then 132 then recreates the original ATM header 136 by replacing the compressed header 134 to the corresponding VPI/VCI from the table 126, as shown by address map 138, and forwards the message traffic on the egress lines 124, as shown by dotted lines 140 and 142. Note that in particular configuration the actual bit counts may differ, such as, for example, in the case of additional paths between the backhaul gateways. However, it should be noted that the specification of the transport path, occupying 5 bytes for the conventional VPI/VCI, reduces to fewer bytes employed to specify the path between the backhaul gateways 30 and 40.

Figure 15:
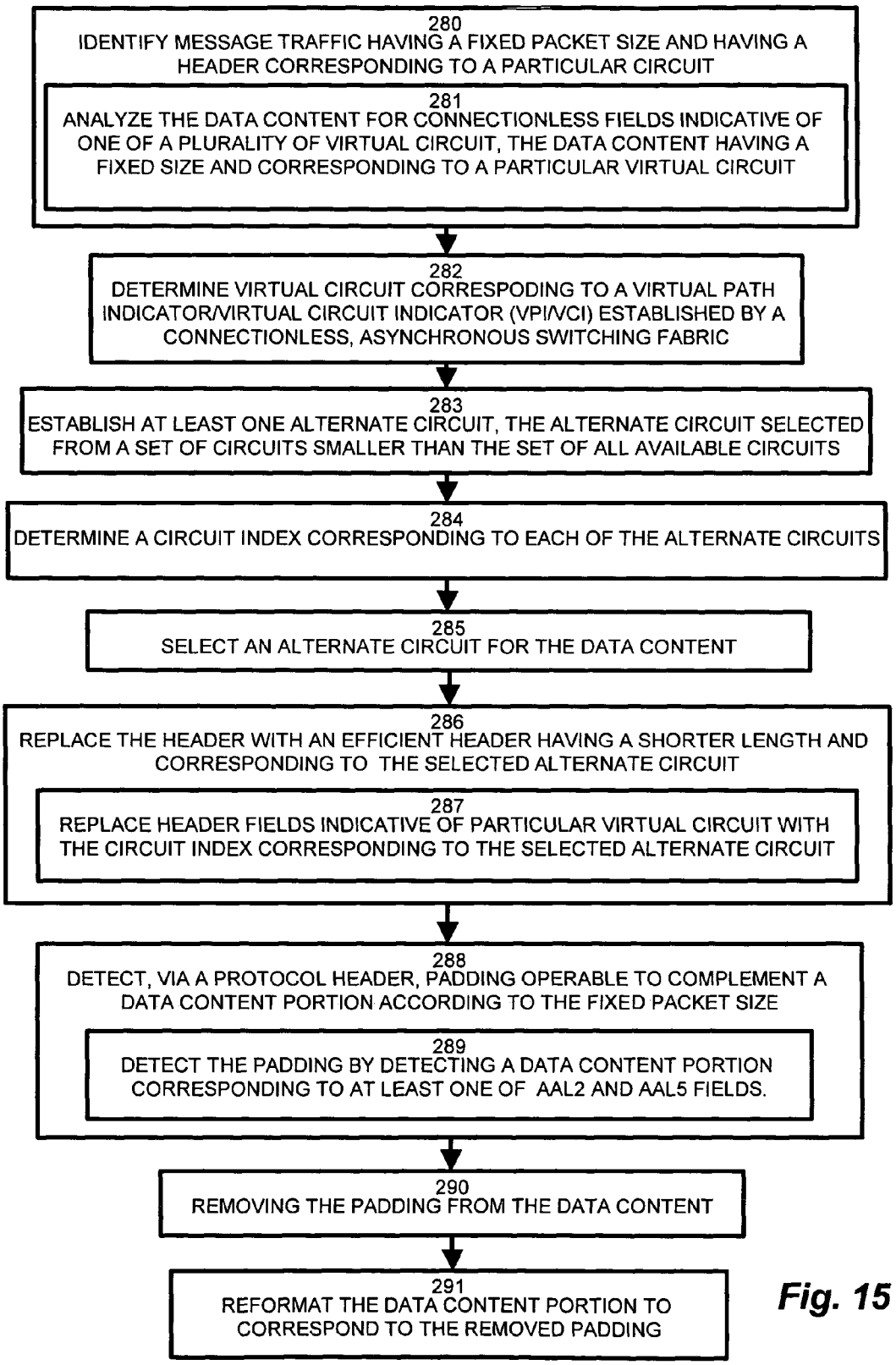
FIG. 15 shows a flowchart of ATM header compression as in FIG. 14.

FIG. 15 shows a flowchart of ATM header compression as in FIG. 14. Referring to FIGS. 14 and 15, at step 280, the reducer 58 identifying message traffic having a fixed packet size and having a header corresponding to a particular incoming virtual circuit. At step 281, identifying includes analyzing the data content for connectionless fields indicative of one of a plurality of virtual circuit, the data content having a fixed size and corresponding to a particular virtual circuit. At step 282, the reducer 68 identifies the virtual circuit corresponds to a virtual path indicator/virtual circuit indicator (VPI/VCI) established by a connectionless, asynchronous switching fabric. ATM transmissions are characterized by a fixed 53 byte size and a 5 bit header identifying the virtual circuit. The connectionless nature of ATM communications allows identification in this manner.

At step 283, the backhaul gateway establishes alternate circuits, the alternate set from a set of circuits smaller than the set of all available circuits (i.e. all available VCI/VPI permutations). At step 284, the backhaul gateway determining a circuit index corresponding to each of the alternate circuits. The smaller range allows identification using fewer bits. At step 285, the reducer 58 selects an alternate circuit for the data content. At step 286, the reducer 58 replaces the 5 bit header fields indicative of particular virtual circuit with the smaller circuit index corresponding to the selected alternate circuit. At step 287, replacing includes replacing the header with one of the alternate circuit indices from step 284 to provide an efficient header having a shorter length and corresponding to a replacement circuit from a smaller set of available circuits. In the exemplary configuration shown in FIG. 14, four alternate circuits allow specification in 2 bits.

At step 288, the reducer 58 detects, via the ATM protocol header 136, padding operable to complement a data content portion according to the fixed packet size. At step 289, detecting the padding further includes detecting a data content portion corresponding to at least one of AAL2 and AAL5 fields. Since the ATM transmissions have a fixed size, transmissions employ padding to satisfy cell sizes. At step 290, the reducer 58 removes the padding from the data content, and at step 291, reformats the data content portion to correspond to the removed padding. In addition to cell padding, employed to maintain the ATM virtual circuit (VCI/VPI) in the absence of payload, idle, or null cells also may be employed to maintain the circuit pending additional payload.

Figure 16:
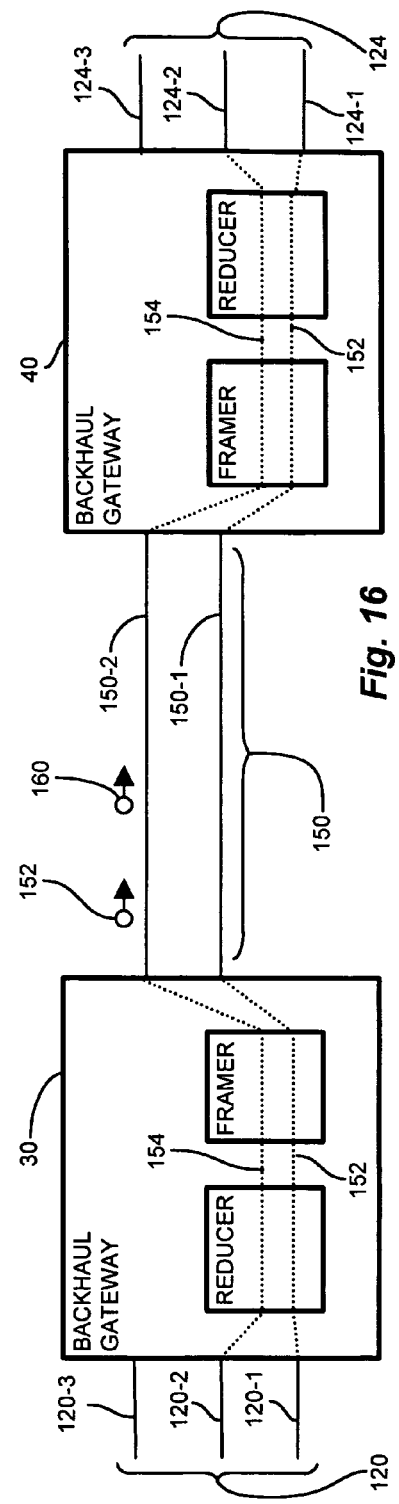
FIG. 16 shows failover processing between the backhaul gateway devices of FIG. 3.

FIG. 16 shows failover processing between the backhaul gateway devices 30, 40 of FIG. 3. Referring to FIGS. 16 and 3, the failover processing performs operations to maintain throughput on available physical lines 150 during absence of the ability to employ the backhaul protocol 67 format due to power, hardware, or other catastrophic failure. In an exemplary configuration, ingress lines 120 incoming to the ingress backhaul gateway 30 include three physical lines 120-1, 120-2 and 120-3. The corresponding egress lines 124 at the egress backhaul gateway include 124-1, 124-2 and 124-3. Two physical lines 150 run between the backhaul gateways 30 and 40.

The two physical lines 150-1 and 150-2 carry the normal message throughput via the backhaul protocol format during normal backhaul gateway 30, 40 operation. The three ingress lines 120 reduce and aggregate to two lines 150 via the backhaul protocol, thereby saving the cost of a physical line. The egress gateway 40 expands the backhaul protocol traffic back onto three physical egress lines 124.

In operation, indication of failure at one of the gateways 30, 40 triggers a backhaul failover mode, initiated by a failover message 152 sent according to the backhaul protocol from the backhaul gateway 30 sensing problems to the complementary backhaul gateway 40 on the other side of the link 150. The failover mode allows the backhaul gateway 30, 40 to operate in a "pass through", or keep alive mode to switch all traffic from one of the ingress lines 120 to one of the backhaul links 150. The failover message 152 indicates to the complementary backhaul gateway 140 that the backhaul protocol is not in use and message traffic will be transmitted in a pass through (unmodified) format, such that the complementary gateway 40 will not attempt to interpret and recreate message traffic according to the backhaul protocol.

Since the ingress lines 120 are mapped directly to the backhaul lines 150, not all ingress lines may be supportable. In the example shown, ingress lines 120-1 and 120-2 map to backhaul links 150-1 and 150-2, respectively, and in turn to egress lines 124-1 and 124-2 at the complementary backhaul gateway 40, as shown by dotted lines 152 and 154. Ingress lines 120-3 remains unsupported in failover mode, as no throughput is available to transport message traffic to egress line 128-3. Upon completion of corrective action, a resume message 162 indicates that the ingress gateway 30 is operational and that the corresponding gateway 40 may resume receiving message traffic according to the backhaul protocol.

Figure 17:
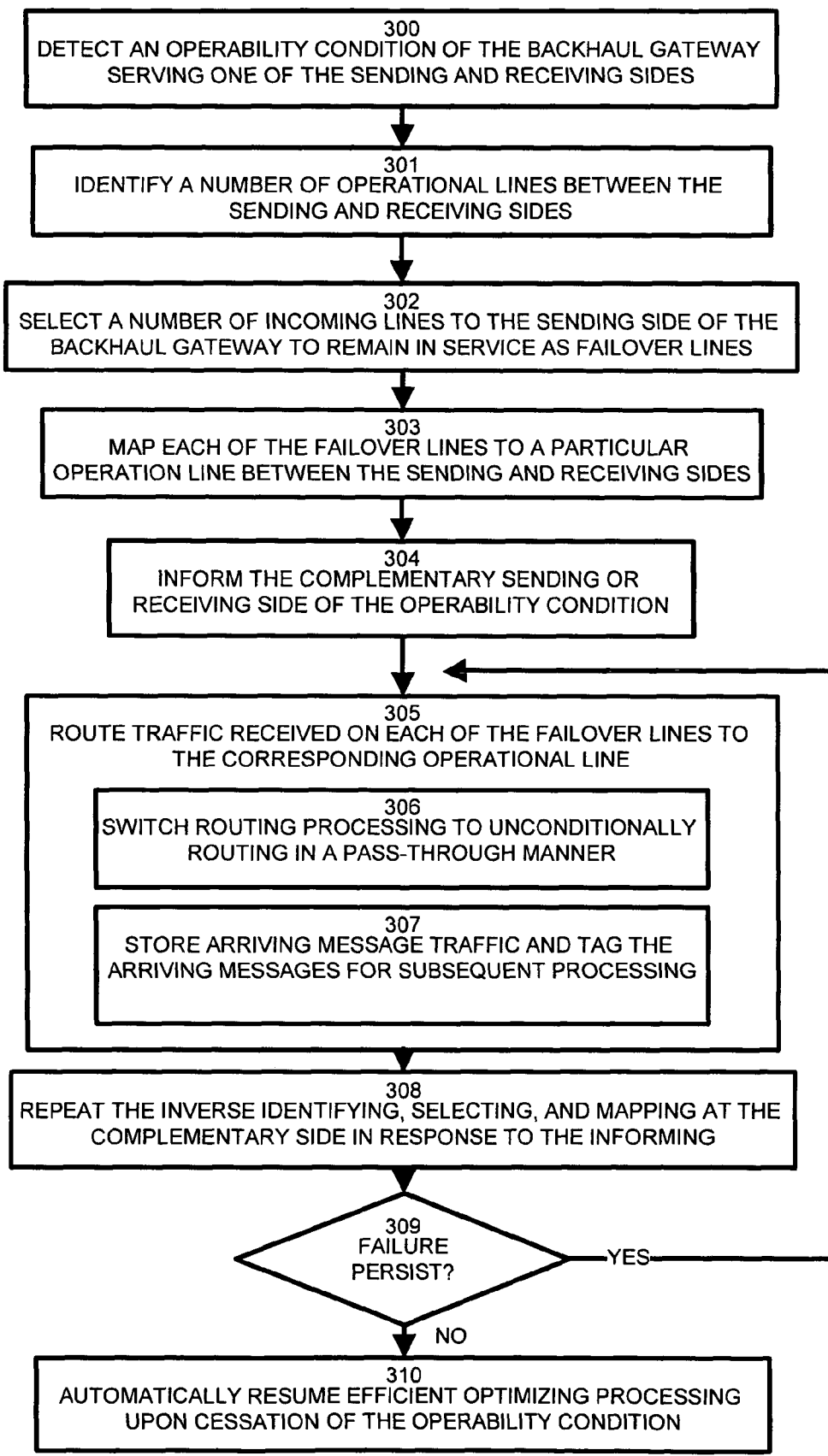
FIG. 17 shows a flowchart of failover between the backhaul gateway devices of FIG. 3.

FIG. 17 shows a flowchart of failover between the backhaul gateway devices of FIG. 16. Referring to FIGS. 16 and 17, at step 300, the backhaul gateway 30, 40 detects an operability condition of itself on one of the sending and receiving sides, such as a power failure, hardware failure, or transmission line interruption. At step 301, one of the gateways 30, 40 identifies a number of operational lines 150-1, 150-2 between the sending 30 and receiving 40 sides. At step 302, the detecting backhaul gateway 30, in the above example, selects a number of incoming lines 120 to the sending side of the backhaul gateway 30 to remain in service corresponding to failover lines 120-1, 120-2. At step 303, the backhaul gateways 30, 40 map each of the failover lines 150 to a particular operational line 150-1, 150-2 between the sending 30 and receiving 40 sides. At step 304, the initiating gateway 30 informs the complementary sending or receiving side 40 of the operability condition triggering the failover operation via the failover message 152.

At step 305, the backhaul gateway 30 routes traffic received on each of the failover lines 120-1, 120-2 to the corresponding operational line 150-1, 150-2, respectively. At step 306, the routing processing for the traffic emanating from the failover lines 120-1, 120-2 further include unconditionally routing in a pass-through manner. Therefore, since the gateway 30 cannot perform reduction and aggregation onto fewer lines, it maintains throughput on a one-to-one basis by funneling all traffic on each ingress failover line 120-1, 120-2 to a corresponding one of the operational lines 150-1, 150-2. At step 307, for the unmapped ingress line 120-3, termination processing further includes storing arriving message traffic and tagging the arriving messages for subsequent processing.

At step 308, in response to the failover message 152, the complementary (opposed) backhaul gateway 40 on the other side of the operational lines 150-1, 150-2, repeats the identifying, selecting, and mapping at the complementary side in response to the informing of the failover status. The failover message 152, therefore, synchronizes both backhaul gateways such that the reduction and aggregation operations, which are to be complementary, that is, occurring on both sides or not at all, cease operation in favor of the failover lines 120-1, 120-2 at the same time.

At step 309, a check is performed by the initiating backhaul gateway 30 to ascertain correction of the condition triggering failover. Such detection is automatic either by polling, or interrupt, or may also be manual via operator assistance. If failure persists, control reverts to step 305 to continue the failover processing. Upon detection of corrective action, at step 310, the detecting gateway 30, 40 sends a resume message 160 to automatically resume efficient optimizing processing upon cessation of the operability failure condition. The resume message 160 is converse to the failover message 152 in that it synchronizes the backhaul gateways 30, 40 to resume complementary reduction and aggregation operations using all ingress lines 120, over the backhaul links 150, to each of the egress lines 124.

In alternate configurations, traffic types other than those specifically enumerated in the exemplary embodiments above will be apparent to those skilled in the art. Such traffic types may include distinct traffic types, or augmentation to the traffic types illustrated above. Further, redundant or repeated information in packet switched data, such as GPRS, EGPRS, and High Speed Circuit Switched Data (HSCSD) over a TDM medium, includes synchronization and filler frames which are candidates for elimination. Other reducible and aggregatable data classifications are applicable. Accordingly, the invention as disclosed above is not intended to be limited except as by the spirit and scope of the amended claims.

In another particular configuration, the backhaul gateway applies overhead limits to mitigate byte stuffing which results in expansion of the aggregated data. While the aggregation and reduction techniques disclosed herein tend to provide reduction in the overall message traffic volume, certain data may trigger expansion of the resulting data. Overhead limits restrict the maximum resulting aggregated traffic to an acceptable proportion of the original size.

Those skilled in the art should readily appreciate that the programs and methods for aggregating and reducing network message traffic as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for aggregating and reducing network message traffic has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for aggregating network message traffic comprising
    identifying regenerable information in the message traffic at a sending side, the regenerable information indicative of data content in the message traffic reproducible at a receiving side from information accessible at the receiving side;
    eliminating, by selective extraction and reduction, the identified regenerable information to reduce volume and associated bandwidth requirements of remaining message traffic to provide reduced message traffic; and
    framing the reduced message traffic according to predetermined formatting logic, the formatting logic providing transmission of the remaining reduced message traffic and regeneration of the reproducible data content from the identified regenerable information at the receiving side.

2. The method of claim 1 wherein the message traffic includes message traffic packets and identifying further comprises:
    examining, in a classifier, portions of a message traffic packet indicative of a message payload carried in the message traffic packet;
    comparing, in the classifier, the portions of the message traffic packet to a predetermined set of expected message traffic types;
    classifying, by classification logic in the classifier, a message traffic type, the message traffic type indicative of the regenerable information in the message traffic packet.

3. The method of claim 1 wherein the eliminating further comprises:
    mapping the message traffic to reducing logic, the reducing logic having reducing rules based on a message traffic type;
    identifying, based on a match between the message traffic type and the reducing rules, the regenerable information, the reducing rules corresponding to the message traffic type; and
    applying a selected reducing rules to the message traffic to generate a reduced message, the reduced message including remaining information in the message traffic without the regenerable information.

4. The method of claim 1 wherein the framing further comprises:
    identifying, according to the formatting logic, non-recreatable portions of the message traffic;
    storing, in a local message traffic packet, the remaining message traffic, the remaining message traffic including the non-recreatable portions of the message traffic; and
    storing, in the local message traffic packet, an indicator corresponding to a eliminated regenerable portion of the message traffic packet, reducing logic at the receiving side being responsive to the indicator to reproduce regenerable portions of the message traffic.

5. The method of claim 4 wherein the indicator occupies less space than the regenerable information it represents.

6. The method of claim 1 wherein framing further comprises formatting, according to the formatting logic, the remaining message traffic into a reduced message packet, the reduced message packet having a common protocol format according to the formatting logic and applicable to a plurality of message traffic types, and operable to be transmitted to the receiving side for recovering original message traffic.

7. The method of claim 1 wherein identifying further comprises:
    identifying segments of speech data in the message traffic, the speech segments having a header including a vocoder field indicative of a vocoder, and a content portion corresponding to speech data; and
    demarcating segments of the speech data corresponding to voice, silence, and idle content portions.

8. The method of claim 7 wherein the eliminating further comprising
    reducing, if the speech data segment corresponds to silence, the duration of the silence content portion by including only a portion of the speech data segment;
    eliminating, if the speech data segment corresponds to an idle content portion, the idle speech data segment from the non-recreatable data content item; and
    processing, if the speech data segment corresponds to a voice content portion, the voice speech data segment as a non-recreatable data content item.

9. The method of claim 8 wherein processing the speech data segment further comprises selectively eliminating a subset of the voice content portions, selectively eliminating corresponding to a traffic shaping metric indicative of throughput.

10. The method of claim 7 wherein the speech data segments are speech frames, the speech frames corresponding to packets of a predetermined voice protocol from a particular vocoder.

11. The method of claim 10 wherein the speech frames correspond to 20 ms of transmission time.

12. The method of claim 10 wherein the vocoder field is indicative of a payload length of the speech frames and is operable to demarcate the segments of speech data.

13. The method of claim 12 wherein each of the vocoder fields comprises vocoder coefficients corresponding to the particular vocoder, and eliminating further comprises grouping common coefficients from different vocoders.

14. The method of claim 1 wherein identifying further comprises:
analyzing the data content for data content segments including signaling data; and
eliminating further comprises eliminating control fields in the signaling data corresponding to control information specified in previous signaling data content segments.

15. The method of claim 14 wherein the signaling data further comprises high-level data link control information operable to provide wireless signal control for at least one of signaling channel selection, power control, reception levels, number dialed, bit padding, keep alive indicators and control flags.

16. The method of claim 14 wherein the message traffic further comprises a plurality of layers, the layers corresponding to the signaling data for mapping and partitioning control, the layers further including:
a receiving layer operable to receive data from a user application;
a selection layer operable to analyze the data in the receiving later and select data adapted to be transmitted;
an efficient optimization layer operable to aggregate and reduce the data adapted to be transmitted, the aggregating and reducing resulting in a lower volume of data for transmission; and
a transport layer operable to transmit a bit-exact payload corresponding to the aggregated and reduced data from the efficient optimization layer.

17. The method of claim 1 further comprising
computing an urgency factor corresponding to a reduced message traffic, the framer responsive to the urgency factor for determining the transmission order for the reduced message traffic;
prioritizing outgoing message traffic from the framer according to the urgency factor, the prioritizing based on a predetermined delay tolerance of a data content type; and
modifying, in the reducer, the reducing logic, the modifying further comprising adjusting compression parameters corresponding to a degree of reduction.

18. The method of claim 17 wherein the degree of reduction is determined by a voice quality ratio, the voice quality ratio indicative of a quantity of data bits per second for voice transmission.

19. The method of claim 17 wherein the urgency factor further includes a priority, the priority corresponding at least to message traffic types of 2G voice data content, 3G voice data content, 3G signaling data content, and IP message traffic.

20. The method of claim 17 wherein the message traffic at the sending side arrives on a particular line, the line having a line type and further comprising determining the line type of at least one of 1G, 2G, 2.5G, and 3G.

21. The method of claim 17 wherein classifying further comprises classifying as a message traffic type selected from a group consisting of 1G voice, 2G voice, 2G data, 3G voice, 3G data, 3G signaling, IP (Internet Protocol), and ATM (Asynchronous Transfer Mode).

22. The method of claim 17 wherein reproducing further comprises reproducing according to type specific aggregation rules, the type of message traffic indicative of the type specific aggregation rules.

23. The method of claim 1 further comprising
identifying message traffic having a fixed packet size and having a protocol header corresponding to a particular circuit;
examining the protocol header of a particular packet:
determining, from the header, whether the packet includes idle data; and
eliminating, if the packet includes idle data, the packet from transmission via a backhaul link.

24. The method of claim 23 further comprising:
replacing the protocol header with an efficient header having a shorter length and corresponding to an alternate circuit from a smaller set of available circuits.

25. The method of claim 23 wherein examining the protocol header occurs prior to receipt of an entire packet.

26. The method of claim 23 wherein the idle data further includes synchronization data for maintaining a virtual circuit independently of transmission demand for payload data.

27. The method of claim 23 further comprising:
detecting, via the protocol header, idle cell payload operable to complement a fixed packet size for maintaining a virtual connection; and
reformatting the data content to correspond to the idle cell to maintain the virtual connection pending additional payload data.

28. The method of claim 23 wherein classifying further comprises
establishing at least one alternate circuit, the alternate circuit selected from a set of circuits smaller than a set of all available circuits;
determining a circuit index corresponding to each alternate circuit;
analyzing the data content for connectionless fields indicative of one of a plurality of virtual circuits, the data content having a fixed size and corresponding to a particular virtual circuit;
selecting an alternate circuit for the data content; and
replacing header fields indicative of the particular virtual circuit with the circuit index corresponding to the selected alternate circuit.

29. The method of claim 23 further comprising:
detecting, via the protocol header, padding operable to complement a data content portion according to the fixed packet size;
removing the padding from the data content; and
reformatting the data content to correspond to the removed padding.

30. The method of claim 29 wherein detecting the padding further comprises detecting a data content portion corresponding to at least one of AAL2 and AAL5 fields.

31. The method of claim 28 wherein the virtual circuit corresponds to a virtual path indicator/virtual circuit indicator (VPI/VCI) established by a connectionless, asynchronous switching fabric.

32. The method of claim 1 further comprising:
detecting an operability condition of a backhaul gateway serving one of the sending and receiving sides, the operability condition causing detrimental operation;
identifying a number of operational lines between the sending and receiving sides;
selecting a number of incoming lines to the sending side of the backhaul gateway to remain in service as failover lines;
mapping each of the failover lines to a particular operational line between the sending and receiving sides;
informing a complementary sending or receiving side of the operability condition; and routing traffic received on each of the failover lines to a corresponding operational line.

33. The method of claim 32 further comprising performing termination processing on the message traffic arriving on the incoming lines other than the failover lines.

34. The method of claim 33 wherein performing the termination processing further includes storing arriving message traffic and tagging the arriving messages for subsequent processing.

35. The method of claim 32 further comprising repeating an inverse of identifying, selecting, and mapping at the complementary side in response to the informing.

36. The method of claim 32 further comprising automatically resuming reduction and aggregation processing upon cessation of the operability condition.

37. The method of claim 32 wherein routing processing on the failover lines further comprises unconditionally routing in a pass-through manner.

38. The method of claim 1 wherein the classifying further comprises:
identifying circuit switched from packet switched traffic, circuit switched traffic characterized in that regular interval based transmission occur and packet switched characterized by recipient identity in the traffic;
identifying signaling and HDLC derived traffic; and
distinguishing speech frames in the message traffic from data traffic and signaling traffic.

39. The method of claim 1 further comprising:
establishing an overhead limit indicative of an acceptable ratio of message traffic to resultant reduced message traffic;
determining when the selective extraction and reduction results in the size of the resultant reduced message traffic exceeding the acceptable ratio; and
limiting the extraction and reduction when the size exceeds the acceptable ratio.

40. A method for receiving a plurality of reduced data streams according to a common protocol format comprising:
encoding a common protocol format as formatting logic at a receiving side of the reduced data streams;
receiving, at the receiving side, the plurality of reduced data streams formatted as remaining message traffic with reproducible data content removed;
unframing, according to the formatting logic, the reduced data according to the common protocol format;
identifying, from a set of aggregation rules, regenerable information corresponding to the received reduced data;
reproducing, based on the identified regenerable information, the reproducible data content eliminated at the sending side;
regenerating, by integrating the reproduced data content with the remaining message traffic, original message traffic including the reproducible data content; and
classifying, by a classifier, the type of the message traffic, a type of message traffic of the original message traffic integrated with the reproducible data content.

41. The method of claim 40 wherein the regenerating corresponds to an original protocol of the original message traffic at the sending side.

42. The method of claim 40 wherein the reproducing of the reproducible data content is undetectable to a remote receiver of a message traffic.

43. A data communications device for aggregating network message traffic comprising:
a classifier operable to identify regenerable information in the message traffic at a sending side, the regenerable information corresponding to data content in the message traffic reproducible at a receiving side from information accessible at the receiving side;
a reducer having reducing logic operable to eliminate the identified regenerable information to reduce volume and associated bandwidth requirements of remaining message traffic to provide reduced message traffic; and
a framer operable to frame the reduced message traffic according to predetermined formatting logic, the formatting logic providing transmission of the remaining reduced message traffic and regeneration of reproducible data content from the identified regenerable information at the receiving side.

44. The data communications device of claim 43 wherein the message traffic includes message traffic packets and wherein the classifier is further operable to:
examine portions of a message traffic packet indicative of a message payload carried in the message traffic packet;
compare the portions of the message traffic packet to a predetermined set of expected message traffic types;
classify, by classification logic in the classifier, a message traffic type, the message traffic type indicative of the regenerable information in the message traffic packet.

45. The data communications device of claim 43 wherein the reducer is further operable to:
map the message traffic to reducing logic, the reducing logic having reducing rules based on a message traffic type;
identify, based on a match between the message traffic type and the reducing rules, the regenerable information, the reducing rules corresponding to the message traffic type; and
apply selected reducing rules to the message traffic to generate a reduced message, the reduced message including remaining information in the message traffic without the regenerable information.

46. The data communications device of claim 43 wherein the framer is further operable to:
identify, according to the predetermined ed formatting logic, non-recreatable portions of the message traffic;
store, in a local message traffic packet, remaining message traffic, the remaining message traffic including the non-recreatable portions of the message traffic; and
store, in the local message traffic packet, an indicator corresponding to the regenerable portion of the message traffic, the reducing logic at the receiving end responsive to the indicator to reproduce the regenerable portions of the message traffic.

47. The data communications device of claim 46 wherein the indicator occupies less space than the regenerable data it represents.

48. The data communications device of claim 43 wherein the framer is further operable to format, according to the formatting logic, the remaining message traffic into a reduced message packet, the reduced message packet format having a common protocol format according to the predetermined formatting logic and applicable to a plurality of message traffic types; and operable to be transmitted to the receiving side for recovering original message traffic.

49. The data communications device of claim 43 wherein the classifier is further operable to:
identify speech data segments the message traffic, the speech data segments having a header including a vocoder field indicative of a vocoder, and a content portion corresponding to speech data; and
demarcate the speech data segments corresponding to voice, silence, and idle content portions.

50. The data communications device of claim 49 wherein the reducer is further operable to:
reduce, if a speech data segment corresponds to silence, the duration of the silence content portion by including only a portion of the speech data segment;
eliminate, if the speech data segment has an idle content portion, the idle speech data segment from the non-recreatable data content item; and
process, if the speech data segment has a voice content portion, the voice speech data segment as a non-recreatable data content item.

51. The data communications device of claim 50 wherein the reducer is further operable to process the speech data segment by selectively eliminating a subset of the voice content portions, selectively eliminating corresponding to a traffic shaping metric indicative of throughput.

52. The data communications device of claim 49 wherein the speech data segments are speech frames, the speech frames corresponding to packets of a predetermined voice protocol from a particular vocoder.

53. The data communications device of claim 52 wherein the speech frames correspond to 20 ms of transmission time.

54. The data communications device of claim 52 wherein the vocoder field is indicative of a payload length of the speech field and is operable to demarcate the speech data segments.

55. The data communications device of claim 54 wherein each of the vocoder fields comprises vocoder coefficients corresponding to a particular vocoder, and eliminating further comprises grouping common coefficients from different vocoders.

56. The data communications device of claim 43 wherein the classifier is further operable to:
analyze the data content for data content segments including signaling data; and
eliminate control fields in the signaling data corresponding to control information specified in previous signaling data content segments.

57. The data communications device of claim 56 wherein the signaling data further comprises high-level data link control information operable to provide wireless signal control for at least one of signaling channel selection, power control, reception levels, number dialed, bit padding, keep alive indicators, and control flags.

58. The data communications device of claim 56 wherein message traffic further comprises a plurality of layers, the layers corresponding to the signaling data for mapping and partitioning control, and to data content fields, the layers further including
a receiving layer operable to receive data from a user application;
a selection layer operable to analyze the data in the receiving later and select data adapted to be transmitted;
an efficient optimization layer operable to aggregate and reduce the data adapted to be transmitted, the aggregating and reducing resulting in a lower volume of data for transmission; and
a transport layer operable to transmit a bit-exact payload corresponding to the aggregated and reduced data from the efficient optimization layer.

59. The data communications device of claim 43 wherein the reducer is further operable to
compute an urgency factor corresponding to the reduced message traffic, the framer responsive to the urgency factor for determining transmission order for formatted message traffic;
prioritize outgoing message traffic from the framer according to the urgency factor and based on a predetermined delay tolerance of the data content type; and
modify the reducing logic, the modifying further comprising adjusting compression parameters corresponding to a degree of reduction.

60. The data communications device of claim 59 wherein the reducer is further operable to determine the degree of reduction by a voice quality ratio, the voice quality ratio indicative of a quantity of data bits per second for voice transmission.

61. The data communications device of claim 59 wherein the urgency factor further includes a priority, the priority corresponding at least to message traffic types of 2G voice data content, 3G voice data content, 3G signaling data content, and IP message traffic.

62. The data communications device of claim 59 further comprising a plurality of ingress lines, wherein the message traffic at the sending side arrives on a particular ingress line, the ingress line having a line type and further comprising determining a line type of at least one of 1G, 2G, 2.5G, and 3G.

63. The data communications device of claim 59 wherein the classifier is further operable classifying a message traffic type selected from the group consisting of 1G voice, 2G voice, 2G data, 3G voice, 3G data, 3G signaling, IP (Internet Protocol), and ATM (Asynchronous Transfer Mode).

64. The data communications device of claim 59 wherein the reducer is further operable to reproduce the reproducible data according to type specific aggregation rules, the atype of message traffic indicative of the type specific aggregation rules.

65. The data communications device of claim 43 further comprising:
a plurality of ingress virtual circuits, the reducer further operable to identify message traffic having a fixed packet size and having a protocol header corresponding to a particular circuit; and
reducing logic in the reducer, the reducing logic further operable to:
examine a protocol header of the particular packet:
determine, from the protocol header, whether the packet includes idle data; and
eliminate, if the packet includes idle data, the packet from transmission via the backhaul link.

66. The data communications device of claim 65 further comprising:
at least one alternate circuit from a smaller set of available circuits, the reducer further operable to replace the header with an efficient header having a shorter length and corresponding to one of the alternate circuits.

67. The data communications device of claim 65 wherein the reducer is further operable to:
establish at least one alternate circuit, the alternate circuit selected from a set of circuits smaller than a set of all available circuits;
determine a circuit index corresponding to each of the alternate circuits;
analyze the data content for connectionless fields indicative of one of a plurality of virtual circuit, the data content having a fixed size and corresponding to a particular virtual circuit;
select an alternate circuit for the data content; and
replace header fields indicative of particular virtual circuit with the circuit index corresponding to the selected alternate circuit.

68. The data communications device of claim 65 wherein the reducer is further operable to examine the protocol header prior to receipt of the entire packet.

69. The data communications device of claim 65 further comprising idle cell payload, wherein the reducer further is operable to:
  detect, via the protocol header, idle cell payload operable to complement a fixed packet size for maintaining a virtual connection; and
  reformat the data content to correspond to the idle cell to maintain the virtual connection pending additional payload data.

70. The data communications device of claim 65 wherein message traffic corresponding to the idle data further includes synchronization data for maintaining a virtual circuit independently of transmission demand for payload data.

71. The data communications device of claim 65 wherein message traffic further comprises:
  cell padding, the reducer further operable to detect, via a protocol header, the cell padding operable to complement a data content portion according to the fixed packet size, the reducer further operable to removing the padding from the data content, reformatting the data content portion to correspond to the removed padding.

72. The data communications device of claim 71 wherein the cell padding further comprises a data content portion corresponding to at least one of AAL2 and AAL5 fields.

73. The data communications device of claim 65 wherein a virtual circuit corresponds to a virtual path indicator/virtual circuit indicator (VPL/VCI) established by a connectionless, asynchronous switching fabric.

74. The data communications device of claim 43 including a backhaul gateway further operable to:
  detect an operability condition of the backhaul gateway serving one of the sending and receiving sides, the operability condition detrimental to message throughput;
  identify a number of operational lines between the sending and receiving sides;
  select a number of incoming lines to the sending side of the backhaul gateway to remain in service as failover lines; and
  map each of the failover lines to a particular operation line between the sending and receiving sides, the data communications device further comprising a failover message operable to inform a complementary sending or receiving side of the operability condition, the sending side operable to route traffic received on each of the failover lines to the corresponding operational line.

75. The data communications device of claim 74 wherein the backhaul gateway is operable to perform termination processing on message traffic arriving on the incoming lines other than the failover lines.

76. The data communications device of claim 75 wherein the backhaul gateway is operable to perform the termination processing including storing arriving message traffic and tagging the arriving messages for subsequent processing.

77. The data communications device of claim 74 wherein the backhaul gateway is further operable to repeat the inverse of identifying, selecting, and mapping at the complementary sending or receiving side in response to the informing.

78. The data communications device of claim 74 further comprising a resume message, wherein the backhaul gateway is further operable to automatically resume reduction and aggregation processing upon cessation of the operability condition by sending the resume message.

79. The data communications device of claim 74 wherein routing processing on the failover lines further comprises unconditionally routing in a pass-through manner.

80. A data communications device for receiving a plurality of reduced data streams according to a common protocol format comprising:
  a framer encoded with a common protocol format as formatting logic at a receiving side of the reduced data streams;
  at least one packetizing engine operable to receive, at the receiving side, the plurality of reduced data streams formatted as remaining message traffic with reproducible data content removed, the packetizing engine further operable to unframe, according to the predetermined formatting logic, the reduced data according to the common protocol format;
  a reducer having aggregation rules operable to identify, from the aggregation rules, regenerable information corresponding to the received reduced data;
  at least one bandwidth reduction engine in the reducer operable to reproduce, based on the identified regenerable information, the reproducible data content eliminated at the sending side;
  reducing logic in the reducer operable to regenerate, by integrating the reproducible data content with the remaining message traffic, original message traffic including the reproducible data content; and
  a classifier operable to classify a type of message traffic of the original message traffic after integration with the reproducible data content.

81. The data communications device of claim 80 wherein the regenerating corresponds to an original protocol of the original message traffic at the sending side.

82. The data communications device of claim 80 wherein the reducer is operable to reproduce the reproducible data content in a manner undetectable to a remote receiver of message traffic.

83. A data communications system for identifying, aggregating, and reducing message traffic between gateways in for heterogeneous message traffic
  a first network communications gateway and a second network communications gateway connected between a wireless access transceiver and a wired network switching office for aggregating and reducing message traffic comprising:
  a classifier in the first network communications gateway operable to identify, from original message traffic, information at the first network communications gateway which is reproducible from information accessible at the second network information gateway;
  a reducer in the first network communications gateway operable to remove the identified information from the message traffic to be sent from the first network communications gateway to the second network communications gateway, to generate optimized message traffic;
  a framer in the first network communications gateway operable to aggregate, according to an efficient optimization format, the optimized message traffic, the framer further operable to transmit the optimized message traffic from the first network communications gateway to the second network communications gateway, the second network communications gateway operable to reproduce, from the optimized message traffic, the removed, identified information according to the efficient optimization format, to generate original message traffic.

84. The system of claim 83 wherein the first network communications gateway corresponds to a first endpoint receiving a plurality of information streams, each of the information streams associated with a particular message type.

85. The data communications system of claim 83 further comprising:
   classification logic in the classifier operable to parse message traffic and compare the parsed message traffic to expected message types;
   reducing logic in the reducer, the reducing logic operable to receive an indication of the expected message types and selectively process the message traffic based on the expected message type;
   aggregation rules in the reducing logic, each of the aggregation rules corresponding to a particular one of the expected message types, the aggregation rules specifying a set of selective operations for applying to the message traffic, the selective operations operable to extract data corresponding to recreatable information, and further operable to generate reduced and aggregated data including unrecreatable data;
   a plurality of bandwidth reduction engines operable to apply the aggregation rules to the message traffic;
   a formatter operable to apply a backhaul protocol to the unrecreatable data, the backhaul protocol further operable to enumerate each of the expected message types according to a common protocol format;
   formatting logic in the formatter operable to frame the unrecreatable data according to the common protocol format, and further operable to identify the eliminated recreatable data in the framed common protocol format; and
   a plurality of packetizing engines operable to packetize and transmit, to the second communications gateway, framed data in message packets according to the common protocol format.

86. A computer system, comprising:
   a memory system;
   a processor;
   an interface coupled to a network;
   a common access gateway; and
   an interconnection mechanism connecting the processor, the memory system, the interface and the common access gateway;
   wherein the memory system is encoded with a gateway reduction and aggregation application that when performed on the processor, produces a gateway process that performs reduction and aggregation of network communications through the network, the gateway and aggregation application performing:
   identifying regenerable information in the message traffic at a sending side, the regenerable information corresponding to data content in the message traffic reproducible at a receiving side from information accessible at the receiving side;
   eliminating the identified regenerable information to reduce volume and associated bandwidth requirements of remaining message traffic to provide reduced message traffic; and
   framing the remaining message traffic according to predetermined formatting logic, the formatting logic providing transmission of the reduced message traffic and regeneration of reproducible data content from the identified regenerable information at the receiving side.

87. The computer system of claim 86 wherein the common access gateway further comprises a classifier, a reducer, a framer, a vocoder, and a shaper.

88. A computer program product having a computer readable medium operable to store computer program logic embodied in computer program code encoded thereon for aggregating network message traffic comprising:
   computer program code for identifying regenerable information in the message traffic at a sending side, the regenerable information corresponding to data content in the message traffic reproducible at a receiving side from information accessible at the receiving side;
   computer program code for eliminating the identified regenerable information to reduce volume and associated bandwidth requirements of remaining message traffic to provide reduced message traffic; and
   computer program code for framing the remaining message traffic according to predetermined formatting logic, the formatting logic providing transmission of the remaining reduced message traffic and regeneration of reproducible data content from the identified regenerable information at the receiving side.

89. A computer data signal for aggregating network message traffic comprising:
   program code for identifying regenerable information in the message traffic at a sending side, the regenerable information corresponding to data content in the message traffic reproducible at a receiving side from information accessible at the receiving side;
   program code for eliminating the identified regenerable information to reduce volume and associated bandwidth requirements of remaining message traffic to provide reduced message traffic; and
   program code for framing the remaining message traffic according to predetermined formatting logic, the formatting logic providing transmission of the reduced message traffic and regeneration of reproducible data content from the identified regenerable information at the receiving side.

90. A network communications device for aggregating network message traffic comprising:
   means for identifying regenerable information in the message traffic at a sending side, the regenerable information including data content in the message traffic reproducible at a receiving side from information accessible at the receiving side;
   means for eliminating the identified regenerable information to reduce volume and associated bandwidth requirements of remaining message traffic to provide reduced message traffic; and
   means for framing the remaining message traffic according to predetermined formatting logic, the formatting logic providing transmission of the reduced message traffic and regeneration of reproducible data content from the identified regenerable information at the receiving side.

* * * * *

UNITED STATES PATENT AND TRADEMARK OFFICE
CERTIFICATE OF CORRECTION

PATENT NO. : 7,072,296 B2
APPLICATION NO. : 10/633260
DATED : July 4, 2006
INVENTOR(S) : R. Brough Turner et al.

It is certified that error appears in the above-identified patent and that said Letters Patent is hereby corrected as shown below:

Claim 64, Column 32, Line 30, "to type specific aggregation rules, the atype of message" should read -- to type specific aggregation rules, the type of message --

Signed and Sealed this

Nineteenth Day of September, 2006

JON W. DUDAS
*Director of the United States Patent and Trademark Office*